(12) United States Patent
Akselrod et al.

(10) Patent No.: US 10,776,501 B2
(45) Date of Patent: Sep. 15, 2020

(54) AUTOMATIC AUGMENTATION OF CONTENT THROUGH AUGMENTATION SERVICES

(71) Applicant: Microsoft Corporation, Redmond, WA (US)

(72) Inventors: Gregory Akselrod, Seattle, WA (US); Donald Gordon Hardy, Seattle, WA (US); Pradeep Chilakamarri, Redmond, WA (US); Shikha Devesh Desai, Bellevue, WA (US); Bernhard S. J. Kohlmeier, Seattle, WA (US); Ian William Mikutel, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 226 days.

(21) Appl. No.: 14/318,930

(22) Filed: Jun. 30, 2014

(65) Prior Publication Data
US 2015/0046827 A1 Feb. 12, 2015

Related U.S. Application Data

(60) Provisional application No. 61/863,241, filed on Aug. 7, 2013.

(51) Int. Cl.
*G06F 21/62* (2013.01)
*G06F 16/955* (2019.01)
(Continued)

(52) U.S. Cl.
CPC ........ *G06F 21/6218* (2013.01); *G06F 3/0481* (2013.01); *G06F 16/908* (2019.01);
(Continued)

(58) Field of Classification Search
CPC ........ G06F 17/24; G06F 17/25; G06F 17/278; G06F 17/30887; G06F 17/3089;
(Continued)

(56) References Cited

U.S. PATENT DOCUMENTS

| | | |
|---|---|---|
| 5,953,720 A | 9/1999 | Mithal et al. |
| 7,007,034 B1 | 2/2006 | Hartman, Jr. et al. |

(Continued)

FOREIGN PATENT DOCUMENTS

| | | |
|---|---|---|
| CN | 101237465 A | 8/2008 |
| CN | 101490676 A | 7/2009 |

(Continued)

OTHER PUBLICATIONS

"International Search Report and Written Opinion Issued for PCT Application No. PCT/US2014/050009", dated Dec. 15, 2014, 13 Pages.

(Continued)

*Primary Examiner* — Kavita Padmanabhan
*Assistant Examiner* — Jenq-Kang Chu
(74) *Attorney, Agent, or Firm* — Talem IP Law, LLP

(57) ABSTRACT

A method of automatically augmenting content through augmentation services can include invoking a service to receive an entity determination based on the content and an entity container comprising an object of the content and one or more attributes of the object. The entity determination and corresponding entity container can be assigned as a marker to content being clipped. The marker can be used to enable access and actions that can be taken with respect to the clipping or the structured information augmenting the clipping.

22 Claims, 14 Drawing Sheets

(51) Int. Cl.
  *G06Q 10/10* (2012.01)
  *G06F 16/908* (2019.01)
  *G06F 40/295* (2020.01)
  *G06F 3/0481* (2013.01)

(52) U.S. Cl.
  CPC ........ *G06F 16/9566* (2019.01); *G06F 40/295* (2020.01); *G06Q 10/10* (2013.01)

(58) Field of Classification Search
  CPC ............... G06F 21/6218; G06F 3/0481; G06F 16/9566; G06F 16/908; G06F 40/295; G06T 11/60; A63F 2300/5553; A63F 2300/6623; G06Q 10/10
  USPC .................................. 715/201, 202, 230, 255
  See application file for complete search history.

(56) References Cited

U.S. PATENT DOCUMENTS

| | | | |
|---|---|---|---|
| 7,519,573 | B2 | 4/2009 | Helfman et al. |
| 7,895,243 | B1 | 2/2011 | Baer et al. |
| 7,949,642 | B2 | 5/2011 | Yang et al. |
| 8,135,589 | B1 | 3/2012 | Reding et al. |
| 8,255,819 | B2 | 8/2012 | Chang et al. |
| 8,286,076 | B1 | 10/2012 | Szewczyk |
| 8,370,358 | B2 | 2/2013 | Lin et al. |
| 8,429,099 | B1 | 4/2013 | Perkowitz et al. |
| 8,504,583 | B1 | 8/2013 | Ke et al. |
| 8,639,719 | B2 | 1/2014 | Fisher et al. |
| 2003/0135464 | A1* | 7/2003 | Mourad ................ G06F 21/10 705/50 |
| 2004/0220926 | A1 | 11/2004 | Lamkin et al. |
| 2004/0223649 | A1 | 11/2004 | Zacks et al. |
| 2005/0131778 | A1 | 6/2005 | Bennett et al. |
| 2005/0138033 | A1 | 6/2005 | Katta et al. |
| 2005/0216454 | A1 | 9/2005 | Diab et al. |
| 2006/0041589 | A1 | 2/2006 | Helfman et al. |
| 2007/0106952 | A1 | 5/2007 | Matas et al. |
| 2007/0266342 | A1 | 11/2007 | Chang et al. |
| 2007/0288518 | A1 | 12/2007 | Crigler et al. |
| 2008/0082349 | A1 | 4/2008 | Zackrison et al. |
| 2008/0109832 | A1 | 5/2008 | Ozzie et al. |
| 2008/0195664 | A1 | 8/2008 | Maharajh et al. |
| 2008/0201452 | A1 | 8/2008 | Athas et al. |
| 2008/0294981 | A1 | 11/2008 | Balzano et al. |
| 2009/0006454 | A1* | 1/2009 | Zarzar ................ G06F 17/2247 |
| 2009/0070689 | A1* | 3/2009 | Park ........................ G06F 16/958 715/760 |
| 2009/0113301 | A1* | 4/2009 | Fisher ........................ G06F 8/61 715/716 |
| 2009/0157711 | A1 | 6/2009 | Baer et al. |
| 2010/0121877 | A1 | 5/2010 | Fawcett et al. |
| 2010/0299362 | A1 | 11/2010 | Osmond |
| 2011/0043652 | A1 | 2/2011 | King et al. |
| 2011/0078585 | A1 | 3/2011 | King et al. |
| 2011/0125784 | A1 | 5/2011 | Cocheu et al. |
| 2011/0246937 | A1 | 10/2011 | Roberts et al. |
| 2012/0010995 | A1 | 1/2012 | Skirpa et al. |
| 2012/0023131 | A1 | 1/2012 | Downey et al. |
| 2012/0066581 | A1 | 3/2012 | Spalink |
| 2012/0076413 | A1 | 3/2012 | Ferman |
| 2012/0117093 | A1 | 5/2012 | Shilovitsky et al. |
| 2012/0144315 | A1 | 6/2012 | Rosenberger et al. |
| 2012/0191728 | A1 | 7/2012 | Libin et al. |
| 2012/0278080 | A1 | 11/2012 | Singh et al. |
| 2013/0036117 | A1 | 2/2013 | Fisher et al. |
| 2013/0046761 | A1 | 2/2013 | Soderberg et al. |
| 2013/0054371 | A1* | 2/2013 | Mason .................... G06Q 30/02 705/14.64 |
| 2013/0084000 | A1 | 4/2013 | Bhardwaj et al. |
| 2013/0124513 | A1 | 5/2013 | Bignert et al. |
| 2013/0173604 | A1 | 7/2013 | Li et al. |
| 2013/0198642 | A1* | 8/2013 | Carney ................ G06F 3/0484 715/738 |
| 2013/0212463 | A1 | 8/2013 | Pachikov et al. |
| 2013/0325870 | A1* | 12/2013 | Rouse .................... G06F 16/41 707/741 |
| 2014/0304836 | A1 | 10/2014 | Velamoor et al. |
| 2015/0046260 | A1 | 2/2015 | Engebretsen et al. |
| 2015/0046493 | A1 | 2/2015 | Akselrod et al. |
| 2015/0046779 | A1 | 2/2015 | Akselrod et al. |

FOREIGN PATENT DOCUMENTS

| | | |
|---|---|---|
| CN | 103020619 A | 4/2013 |
| CN | 103177075 A | 6/2013 |
| CN | 103189835 A | 7/2013 |
| EP | 1843256 A1 | 10/2007 |

OTHER PUBLICATIONS

"International Preliminary Report on Patentability Issued in PCT Patent Application No. PCT/US2014/050009", dated Jul. 30, 2015, 8 Pages.

"Getting Started with Evernote Web Clipper", Published on: Mar. 8, 2013, Available at: http://evernote.com/webclipper/guide/#1.

"Content Analysis Documentation for Yahoo! Search", Retrieved on: Apr. 2, 2013, Available at: http://developer.yahoo.com/search/content/V2/contentAnalysis.html.

"Second Written Opinion Issued in PCT Application No. PCT/US2014/050009", dated May 27, 2015, 7 Pages.

"Office Action Issued in European Patent Application No. 14758726.5", dated Mar. 6, 2017, 6 Pages.

"Evernote", Retrieved from: <<http://www.dsruption.com/evernote/a/5287d9337782650200000095>>, Retrieved on: Nov. 26, 2013, 4 Pages.

"Final Office Action Issued in U.S. Appl. No. 14/319,654", dated Oct. 27, 2017, 36 Pages.

"Final Office Action Issued in U.S. Appl. No. 14/319,654", dated Dec. 27, 2016, 43 Pages.

"Non Final Office Action Issued in U.S. Appl. No. 14/319,654", dated Jul. 11, 2016, 37 Pages.

"Non Final Office Action Issued in U.S. Appl. No. 14/319,654", dated Apr. 14, 2017, 38 Pages.

"Non Final Office Action Issued in U.S. Appl. No. 14/319,654", dated May 4, 2018, 27 Pages.

"Final Office Action Issued in U.S. Appl. No. 14/470,491", dated Dec. 5, 2017, 15 Pages.

"Non Final Office Action Issued in U.S. Appl. No. 14/470,491", dated Apr. 6, 2017, 17 Pages.

"Non Final Office Action Issued in U.S. Appl. No. 14/470,491", dated Mar. 19, 2018, 26 Pages.

"Office Action Issued in European Patent Application No. 14753419.2", dated Mar. 6, 2017, 6 Pages.

"Oral Hearing Issued in European Patent Application No. 14753419.2", dated Dec. 21, 2017, 7 Pages.

"Oral Hearing Issued in European Patent Application No. 14758726.5", dated Dec. 21, 2017, 7 Pages.

"Office Action Issued in European Patent Application No. 14834796.6", dated Feb. 15, 2018, 6 Pages.

"Supplementary Search Report Issued in European Patent Application No. 14834796.6", dated Mar. 7, 2017, 9 Pages.

"Office Action Issued in Chinese Patent Application No. 201480044378.X", dated May 2, 2018, 10 Pages.

"First Office Action and Search Report Issued in Chinese Patent Application No. 201480044761.5", dated Aug. 15, 2018, 11 Pages.

"Office Action Issued in Chinese Patent Application No. 201480044794.X", dated May 2, 2018, 13 Pages.

Chakrabarti, et al., "Entity Tagger: Automatically Tagging Entities with Descriptive Phrases", In 20th International Conference Companion on World Wide Web, Mar. 28, 2011, pp. 19-20.

Dontcheva, et al., "Collecting and Organizing Web Content", In Personal Information Management-Special Interest Group for Information Retrieval Workshop, Aug. 10, 2006, pp. 44-47.

(56) References Cited

OTHER PUBLICATIONS

Dontcheva, et al., "Relations, Cards, and Search Templates: User-Guided Web Data Integration and Layout", In Proceedings of the 20th Annual ACM Symposium on User Interface Software and Technology, Oct. 7, 2007, 10 Pages.

Lerin, Marisa, "10 Tips to Using Evernote", Retrieved from: <<https://www.pixelscrapper.com/blog/10-tips-to-using-evernote>>, Apr. 27, 2013, 9 Pages.

Nguyen, et al., "Synthesizing Products for Online Catalogs", In Proceedings of the VLDB Endowment, vol. 4, Issue 7, Apr. 1, 2011, pp. 409-418.

Pan, et al., "Image Search by Graph-Based Label Propagation with Image Representation from DNN", In Proceedings of the 21st ACM International Conference on Multimedia, Oct. 21, 2013, 4 Pages.

"International Search Report and Written Opinion Issued in PCT Application No. PCT/CN2014/081107", dated Sep. 28, 2014, 13 Pages.

"International Preliminary Report on Patentability Issued in PCT Application No. PCT/US2014/050007", dated Nov. 25, 2015, 6 Pages.

"International Search Report and Written Opinion Issued in PCT Patent Application No. PCT/US2014/050007", dated Dec. 15, 2014, 13 Pages.

"Second Written Opinion Issued in PCT Application No. PCT/US2014/050007", dated Jun. 12, 2015, 6 Pages.

Yi, et al., "Web Page Cleaning for Web Mining through Feature Weighting", In Proceedings of the 18th International Joint Conference on Artificial Intelligence, Aug. 9, 2013, pp. 43-48.

Yi, et al., "Eliminating Noisy Information in Web Pages for Data Mining", In Proceedings of the Ninth ACM SIGKDD International Conference on Knowledge Discovery and Data Mining, Aug. 24, 2003, 10 Pages.

"Final Office Action Issued in U.S. Appl. No. 14/319,654", dated Jan. 8, 2019, 27 Pages.

"Second Office Action Issued in Chinese Patent Application No. 201480044378.X", dated Dec. 4, 2018, 12 Pages.

"Second Office Action Issued in Chinese Patent Application No. 201480044794.X", dated Dec. 5, 2018, 14 Pages.

"Non Final Office Action Issued in U.S. Appl. No. 14/319,654", dated Nov. 22, 2019, 31 Pages.

"Notice of Allowance Issued in U.S. Appl. No. 14/319,654", dated Jun. 17, 2020, 12 Pages.

* cited by examiner

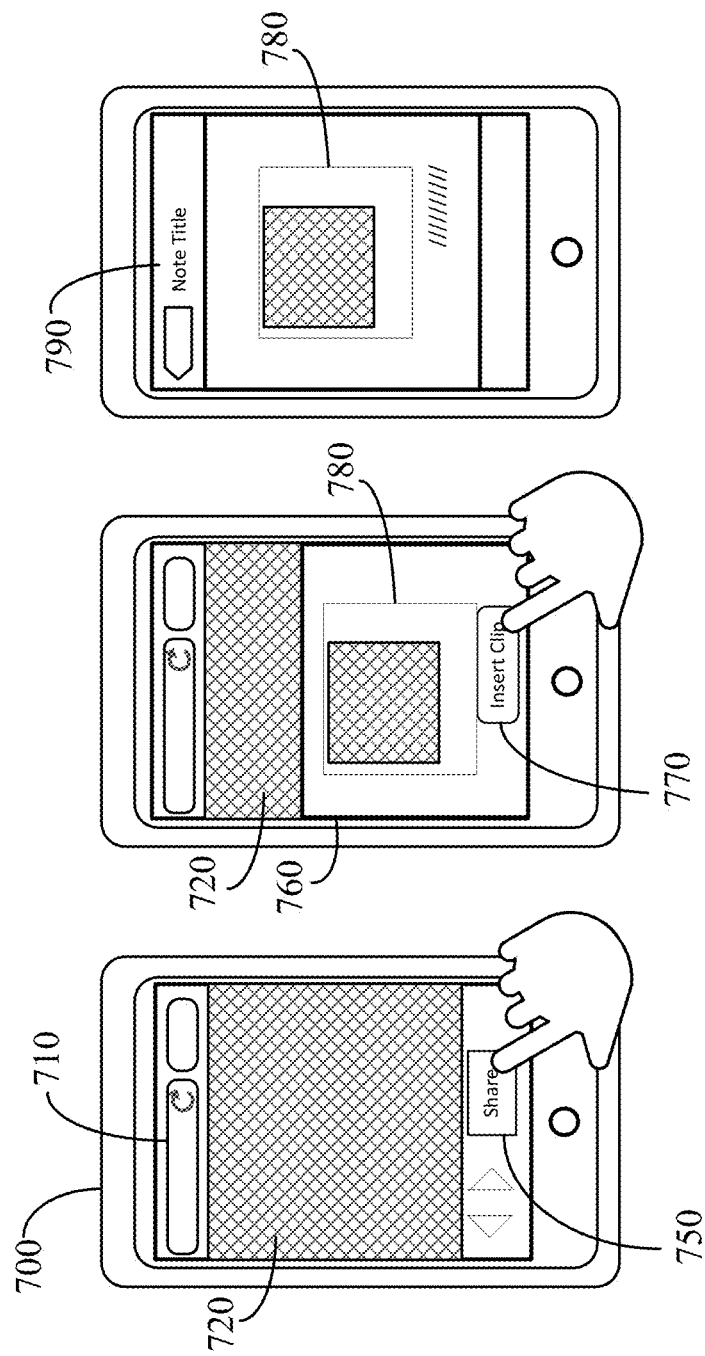

AUTOMATIC AUGMENTATION OF CONTENT THROUGH AUGMENTATION SERVICES

CROSS-REFERENCE TO RELATED APPLICATION

This application claims the benefit of U.S. Provisional Application Ser. No. 61/863,241, filed Aug. 7, 2013.

BACKGROUND

Collecting content for later access, organization, and modification is facilitated by a variety of webpage and user-generated content capture tools and their associated collection and curation applications such as Microsoft OneNote® and Evernote® notebook applications. A "web clipper" is a tool that generally runs on a web browser at a client to enable clipping of content from a web page displayed from a web browser. Other tools and input mechanisms may be used to gather and save content. For example, audio or video may be captured by a microphone and camera; and certain text may be captured by a keyboard, keypad, touchscreen, or mouse.

Currently, content is generally captured as-is. That is, capture tools collect a full webpage, an entire selected portion of a webpage or document, a photograph, a screenshot, a recording or a subset of such content. In some cases, when clipping a uniform resource location (URL), a specified thumbnail or snippet that is found in the hypertext markup language (HTML) of the web page, is captured. Thus, content from a web page, document, or directly entered into an application by a user is able to be captured and stored for later use. In order to enhance such collections, a user may add tags and annotate the captured content; however, keyword tagging may not be uniform across users or consistent for a same user.

BRIEF SUMMARY

Augmentation and other enhancements to content being collected, authored, consumed, or clipped are described. Entry points for the services providing augmentation can be, for example, from clippers, readers, document viewers, word processing and other productivity applications, and collection and curation applications.

Techniques are described that provide a user with content capturing options that recognize the subject matter of content being clipped or otherwise captured, and supply additional information relevant to the clipped subject matter that is otherwise not immediately available to the user at the time of clipping. The content can include a uniform resource identifier (URI) such as a URL (uniform resource locator), audio, video, image, photograph, word processing document, hypertext markup language (HTML) document, presentation document, Adobe® Portable Document Format (PDF), and the like.

According to certain implementations, a clipper can recognize an entity on a web page or other document and capture the entity into storage in a defined structure through a capture service that includes or communicates with an augmentation service. The structure can be an entity container, providing an object and one or more attributes of the object. The entity container can further include a service element for taking an action related to the entity. The entity container can include content from the web page and content obtained from multiple sources across the Internet.

The entity determination and corresponding entity container can be assigned as a marker to the content being clipped. The marker can be used to enable access and actions that can be taken with respect to the clipping or the structured information augmenting the clipping.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 7A-7C illustrate a scenario for a notebook application that may be implemented on a mobile device having a web browser client.

DETAILED DESCRIPTION

Figure 1:
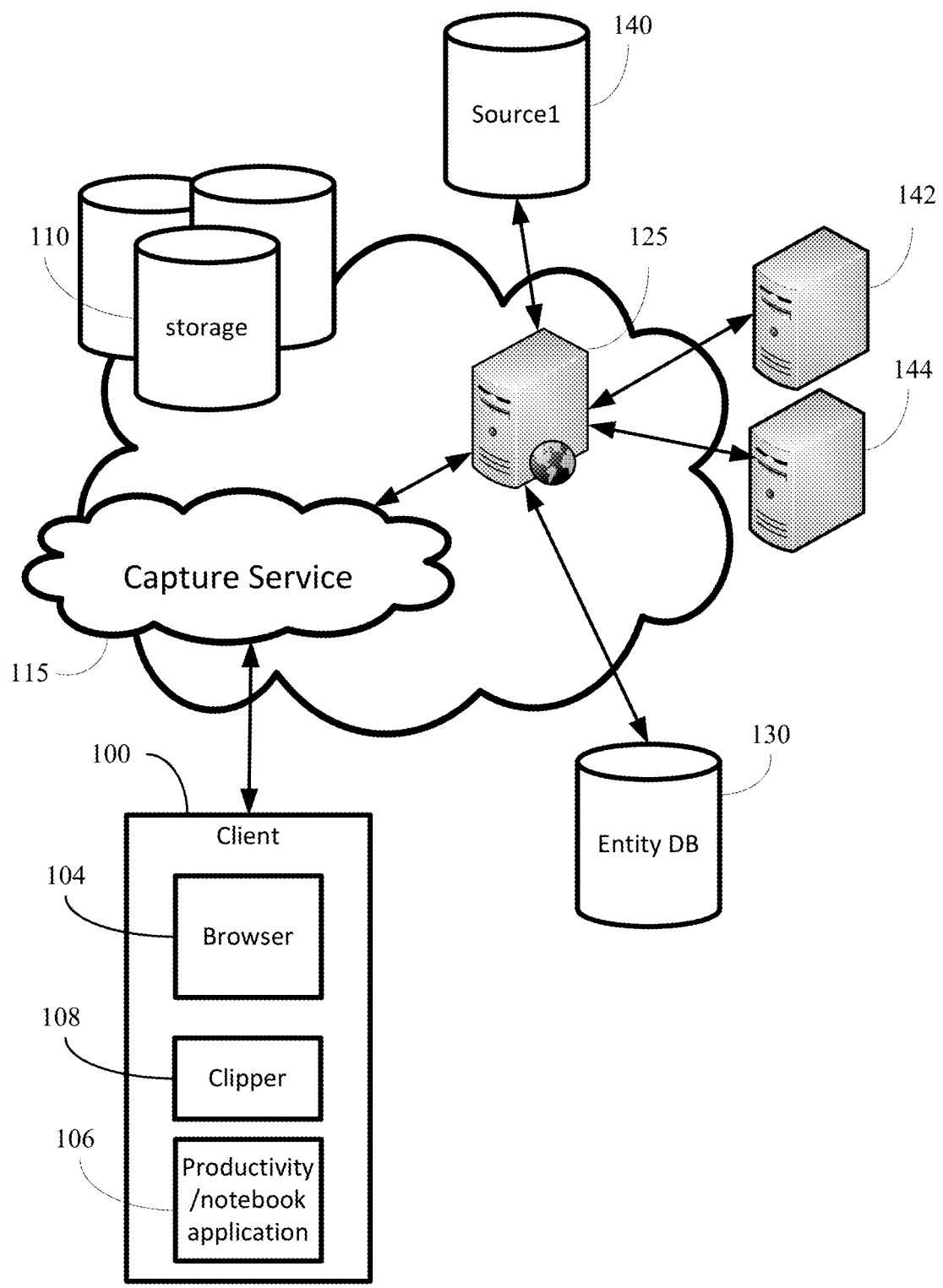
FIG. 1 illustrates an operating environment for capturing data.

Augmentation and other enhancements to content being collected, authored, consumed, or clipped are described. Augmentation services are presented that may be provided as part of a capture service. Through capture services (that include augmentation services), a clip from a web page or other document can be processed in multiple ways depending on the nature and/or context of what is being clipped. In some implementations, a clipper, via a capture service, can recognize entities on a webpage during clipping, render a preview of the entity at clipping time, and capture the entity into storage in a structured manner that can be accessed and used later.

The content being clipped or otherwise captured can be, for example, audio, photos, video, formatting, style, layout and/or text from a webpage or other document file type (which includes file formats of HTML, PDF, Microsoft Word® document (DOC), Office Open Extensible Markup Language (OOXML) format (DOCX) and the like).

In some cases, document understanding technology may be used to parse the content in order to identify and understand objects on the page (e.g., entity type determination). This way it is possible to understand what is on the page, for example, if the content is about a movie, a book, etc.

An entity may refer to a person, place, thing, event, task, or concept. An object of an entity references a tangible form of the entity. An entity is a strong entity type if it has at least one specified attribute and is not dependent on another entity. For example, "The Lord of the Rings" names an object of a "book" entity type that can be defined with attributes that may include title, author, and International Standard Book Number (ISBN) number. The "book" entity can be considered a strong entity type, whereas "ISBN" is dependent on the book and would not be considered to be a strong entity type.

In some methods, a service makes an entity determination from content and creates an entity container for recognized entities. A client can receive the determined entity with the entity container providing an object and one or more attributes (attribute elements) of the object. In some implementations, the entity container further includes service elements. A service element can enable a user to take an action related to the entity (e.g., purchase an item, set calendar events, share and recommend an item). The services available for the service elements can be made available from a variety of online services. The attributes of the object can be obtained from multiple sources across the Internet.

In certain implementations, elements on a page being captured for a note (or retrieved from sources at various locations) can be arranged into structured data so that the information can be shown (e.g., rendered) in a contextual appropriate way. That is, a transformed view of the thing (i.e. the entity) the user is trying to capture can be presented and stored. This can also be adjusted for the device (for example, depending on available bandwidth, display screen size, viewing application, and other client-specific characteristics).

Advantageously, certain implementations provide the ability to capture structured content and maintain its semantics all the way though capture, recall, and reuse. This enables the user to capture what is truly of interest to the user and store it in a preferred location and format. Furthermore, upon recall, relevant information can be accessible at the right time and place.

Techniques are described that provide a user with content capturing options that recognize the subject matter of the content being captured and supply additional information relevant to the captured subject matter that is otherwise not immediately available to the user at the time of capture. This augmentation, along with other enhancements, can be automatic or performed in response to a user's request. Augmentation services are presented that may be provided as part of a capture service (e.g., a service associated with a notebook application such as Microsoft OneNote® or Evernote®).

The augmented content can include more specific and/or relevant content to that which is provided in the web page or other document. The capture services facilitate the augmentation of content by accessing additional information relating to the content and/or manipulating the content in custom and convenient ways.

The augmentation of the content can further facilitate taking action with the entity, the object of the entity, or the attributes of the object. The consistent structure of the entity container facilitates cross-platform and forwards-backwards compatibility. In addition, enhanced user experiences can be facilitated through understanding the subject (entity) that is being collected. Certain implementations apply structure and semantics to the user's notes in order to enhance the entire experience.

In some cases, the augmentation occurs at the time of collection (e.g., as a user is clipping content from a web page or following the input of an item to a note). In some cases, the augmentation can be performed while a user is modifying or manipulating content in a document, for example, in a note of a notebook application. In some cases, the augmentation can be performed when content is being saved into a document. Other cases may be suitable for automatic or user-requested augmentation as well.

FIG. 1 illustrates an operating environment for capturing data. Referring to FIG. 1, a capture service 115 can facilitate entity determination and augmentation of a clip or other content input to a notebook application to include entity-related features and/or functionality. As part of the entity determination, entity recognition can be performed with respect to the content being captured. This process may be performed locally at a client 100 or as part of the capture service 115.

A capture service 115 of an embodiment performs some processing to customize or augment the clipping for an application. The capture service 115 can provide augmentation services (either directly or indirectly) and may provide an application programming interface for augmentation services. The augmentation services may be provided integral with or independently of capture.

The capture service 115 can be web service that may be hosted in the cloud or run by one or more allocated servers by an entity providing the notebook service and/or the capture service.

A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure. Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), XML, JavaScript Object Notation (JSON), and SOAP (originally an acronym for simple object access protocol). The systems, applications and services described herein may exchange communications in accordance with one or more application programming interfaces (APIs).

Entry points for the services providing augmentation to content can be, for example, from clippers, readers, document or image viewers, word processing and other productivity applications, and collection and curation applications (and tools).

Client(s) 100 can be used to browse the Web and run applications such as a browser 104 and, in some cases, a productivity application or a reader or notebook application 106. Examples of browsers 104 include Microsoft® Internet Explorer, Google Chrome®, Apple Safari®, and Mozilla Firefox®. Examples of productivity applications, readers, and notebook applications 106 include Microsoft® Office, Microsoft OneNote®, Evernote®, Google Drive™, Google® Reader, Apache® OpenOffice, Zoho® Office, Apple® Reeder, and Apple iWork®.

A clipper 108 may be available at the client 100. A clipper 108 is locally running application that can be used to collect and capture content (including augmented content) for a user. Through the clipper 108, a user can select to clip the whole page, extracted portions of the whole page, one or more regions of the page and/or a recognized object/entity of the page (in the form of an entity container). The clipper 108 may be a web clipper, a clipping tool running on an operating system, an application having a clipping feature, or an augmentation feature of a notebook application, as some examples. The clipper 108 may or may not be directly associated with a destination application for the content.

A web clipper typically clips content from a website and inserts the content into a note or other application to which the clipper is associated. Web clippers generally run on a web browser 104 at a client 100. The web clipper may be implemented in JavaScript, as an example, and can be interoperable (and in some cases integrated) with the web browser 104. Because each web browser has different capabilities, web clippers may be configured based on the web browser.

In some cases, the clipper 108 may include a software tool associated with an operating system on a computing device (such as a tablet) that can be invoked to determine the entity that is most dominant on the screen at the time. For example, a touch or non-touch gestural swipe may be used to invoke the tool and get the entity (and in further implementations get the entity container for the dominant entity). As another example, a keyboard button (such as Print Screen) may be depressed to invoke the tool and get the entity.

In some cases, the clipper 108 is included as an add-on, plug-in, or bookmarklet for the browser 104 to clip content rendered in the browser 104. A bookmarklet is an extended functionality for a web browser, usually in the form of a JavaScript program stored as part of a bookmark in a web browser (or hyperlink on a web page). In some cases the clipper may be included as a feature of the operating system (not shown) to capture any content being rendered on a display (similar to a print screen function). In some cases, the clipper may be included as a web function or add-on of the productivity or notebook application 106.

In various embodiments, the clipper 108 can collect and capture content that is then stored in the "cloud" storage 110 or at another remote (non-local) destination. The content (and augmented content) can be stored in a repository associated with a particular user's account. The cloud refers to the storage and systems that are made available to a user over the Internet as part of a hosted service. The captured content may be stored locally at the client as well.

Content can be sent to a user's note or other application document through the clipper 108. The note or other application document may be stored in the cloud (e.g., in a repository associated with the user at storage 110). In some cases, a local copy of the note or other application is available. The note or other application document may be accessed or associated with the application 106 running on the client. The clipper 108 can provide content from the browser 104 (or some other application) to multiple notes and/or other application documents, as well as present additional functionality and enhancements through the capture service 115.

When using the capture service 115 to recognize an entity (or more than one entity) from the content, the capture service 115 may interface with the cloud storage 110 and/or destination storage (e.g., enterprise server or other specific remote storage) (not shown), for example by providing the content (and any enhancements or augmentation of the content) to the cloud storage 110 and/or destination storage.

A locally running application (e.g., clipper 108) can call the capture service 115 (via an API).

In some implementations, as part of the augmentation, the capture service may communicate with a web data service 125 to obtain information from a database 130 of related structured content (also referred to as "structured knowledge" or a "knowledge graph"). The database 130 may be aggregated and hosted by search engine providers such as Google® and Bing®; however other knowledge base databases that are accessible over the Internet, other networks (private and/or public), or even on a user's local machine may be used. In one implementation, the capture service 115 can obtain structured content from database 130 directly.

In some cases, the related structured content can be generated on the spot. In one such case, the capture service 115 can communicate with a search engine service to perform a search. The search engine service can retrieve information from a variety of sources across the Internet (e.g., sources 140, 142, 144). In some cases, the search engine service may be separate functionality provided by the same provider of the web data service 125. In other cases, the search engine service may performed by a different provider.

The capture service can include an API to enable any application to capture an entity on a page, get an entity package, and even store the entity package for a designated application (or at a storage location, or repository, associated with a user and accessible by one or more applications). In some cases, where the page is a web page (or portion of a web page), a card can be obtained by the capture service from a search engine service. The capture service can detect the entity (or entities) of the page from the card.

The application or clipper can request to the service whether there is a recognizable entity for a page or document. The service can determine the dominant object (or objects) and provide an entity container for the object.

The capture service 115 may be implemented using one or more physical and/or virtual servers communicating over a network. In some cases, the capture service 115 may store or maintain an address of the clippings provided from the clipper 108 in the storage 110. The captured content (including entity containers) can be accessed directly from storage 110 or through the capture service 115 for inserting into different types of documents. In some implementations, other clients and servers may communicate with the capture service to utilize the functionality available from the capture service without using the clipper 108.

The various networks described and/or shown as part of the environment illustrated in FIG. 1 can include, but are not limited to, an internet, an intranet, or an extranet, and can be any suitable communications network including, but not limited to, a cellular (e.g., wireless phone) network, the Internet, a local area network (LAN), a wide area network (WAN), a WiFi network, an ad hoc network or a combination thereof. Such networks may involve connections of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Figure 2A:
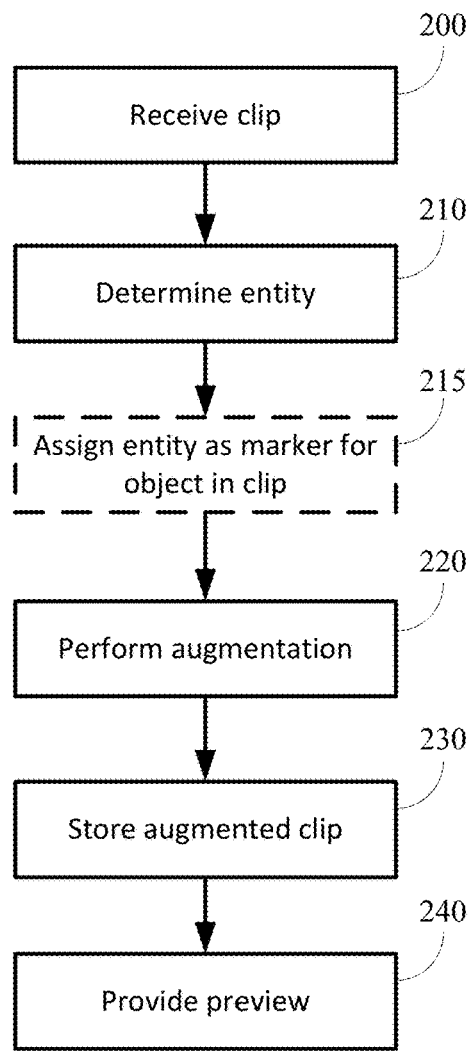
FIG. 2A illustrates an example process flow for a capture service according to an implementation.

FIG. 2A illustrates an example process flow for a capture service according to an implementation. Referring to FIG.

2A, in response to receiving a clip or other content for input to a notebook application (200), an entity determination can be performed (210).

The entity may be automatically resolved or a user may select the type of entity. In some cases, a combination may be appropriate, for example where there is not enough information to determine with a certainty above a threshold that the dominant object is a particular entity.

In some cases, the clip includes a marker or tag indicating the entity type. When the clip includes the indication of entity type, the entity determination can include reading the tag or marker.

In some cases, the entity determination includes analyzing the content of the clip to determine the entity of the clip. The entity of a document or web page can be identified in response to receiving the clip. The entities being identified for use in this case are the strongly typed entities. Any suitable technique for identifying a dominant entity may be used. For example, classification, image recognition, text mining, semantics, and ontology frameworks may be utilized to identify dominant (and non-dominant) entities from a string or other content format.

In some cases, the entity determination involves contacting a search engine service (or other web data service) to request information about a URL, for example, in the form of a "topic card" (defined here as structured and unstructured information about the entity), which can include an indication of the entity (or entities) associated with a web page. In some cases, multiple "topic cards," or models, may be available for a URL.

After the entity is determined (210), the content being collected ("clipped") or otherwise input to a notebook can then be associated with the strongly typed entity in the form of a marker (215). Although this step is illustrated as occurring before performing augmentation (220), the assignment of the marker may be performed at any time after the entity is determined, including after performing augmentation, at a time of storing the clip, and even after providing a preview of the clip.

The marker is similar to a "tag" that can be stored as part of the metadata of the document or page. The marker may even be used as a tag. However, the marker can be associated with an element or object within the document or page as well as the metadata of the page itself. In addition, the marker facilitates additional functionality specific to being a recognizable entity and, in some cases, includes a schema providing a specified structure for attributes of the object being marked. That is, different from a tag, the entity marker presents a standard schema of how to store information related to that entity. While any metadata can be added to describe a page, tagging tends to not be uniform.

In some cases, there may be multiple entities on a same page. For example, a search results page may have multiple wines. As another example, a blog post may include a recipe (one entity) and an article (another entity) about a region visited by the author. Multiple objects of a same entity type or multiple objects of different entity types can be recognized and stored in their corresponding structure.

In some cases, the entities associated with content may each have a confidence value and the content may be marked as an entity with a confidence value above a certain threshold. In some cases, multiple strong entities may exist on a page or document. The individual sections can be marked with their corresponding entity and the page or document as a whole may be marked with the multiple entities.

In some cases where the captured content may include multiple entities (or a situation where it is not possible or easily achievable to narrow results to a single entity based on the content that is captured), the entity determination can include outputting a list of available entities understood by the capture service and determining the entity in response to receiving a selection of one of the available entities. In some cases where an object may exist in different entity forms, for example as a book and a movie, a feature can be included that enables a user to correct or select the entity being referred to. This situation may arise when there are two or more entity types that are applicable to the same general subject matter.

Once an entity is determined (210), augmentation can be performed according to the entity (220). The augmentation can be creation of an entity container, an entity-related processing, or a combination of the two.

The entity container refers to the package of information having a structured schema specific to the entity type. The entity container can be generated in response to receiving a request for an entity container from an application (or clipper) or automatically generated in response to receiving the clip or some other specified event invoking augmentation. The entity container presents a structured collection of data based on a determination of the dominant entity (or entities) of a clip (which may be an entire page or a region selection of a page). When multiple entities are found on a page, each may be identified and their corresponding structured collection of data presented (and/or stored).

A strongly typed entity container is not simply a keyword (or keywords) describing the object. Instead, the entity container provides "what" the thing/object is (e.g., a "book"); provides action(s) that may be taken on the entity (e.g., read reviews about a "book"); enables access to the entity container (e.g., made available to third parties that have permission to access "book" or provide tags for queries); and enables actions to be performed (e.g., "books" can be sent to a wish list of an online book store).

In some cases, the entity container can be generated from one or more cards (or "models") received from a search engine service. The card can include the entity information as well as various attributes related to the object of the entity. Since the search engine service has already analyzed the page and prepared a card, additional analysis to determine an entity associated with the captured content from the local application or the capture service may be omitted.

When the URL of a web page is used to request the associated entity from the search engine service, the card provided for indicating the entity can also be used to generate the entity container.

For the entity-related processing, the clip can be processed or transformed in a number of ways. In certain implementations, the processes can include removing advertisements from main content of a web page or looking up entity tags embedded in HTML of a page by the page author. In some cases, the transforming can include separating readable text from the rendered content to generate an image from the readable text. In some cases, the transforming can include providing hyperlink recognition so that internal links shown in the image can be made "live" and selectable. In some cases, the transforming can include removing repetitive background content from the rendered content. The transforming can be any combination of the above or other types of transformational processes including filtering, text recognition, image recognition, and tagging.

In some cases, from a selected region (or even a full page capture), the capture service can process the data based on recognizable aspects of the data. For example, a selection that contains mostly text can be recognized as an article, and processes can be performed to filter or remove content or other data deemed not relevant by the system in order to present a "clean" view of the data. The "clean" view can be defined by the implementation. An example of a "clean" view is where advertisements and banners are removed from a web page.

As another example, images or multiple pages of the article may be fetched when the clip is recognized as an article.

As yet another example, when a destination for the clipping is a reader application, the HTML of the page can be analyzed to determine whether there is a certain amount of text on the page (to classify the page as a blog, editorial, article, and the like) and a cleaning program can be applied to remove advertisements and/or format the text or other content for reading. In another implementation, the cleaning program may identify portions to keep and extract those portions from the HTML while leaving the ads and any unwanted information behind. Recognition of an "article" can also generate a preview of the container for the article entity in place of or in addition to a preview of the article itself.

In some cases, the processes performed by the capture service include calling another web service or performing processing to determine metadata associated with the content of the web page. The metadata can include topical tags that may then be included with the HTML file or the image to help with search or other processes that may be carried out after capturing the web page. Topical tags include tags related to the content based on the context, images, topics, or other related topics. Certain tags may be suggested or automatically provided based on the recognized entity. For example, if the entity is a book, then a suggested tag may be "to read".

The augmented clipping can be stored (230) and, optionally, provided to the client in a preview (240).

Figure 2B:
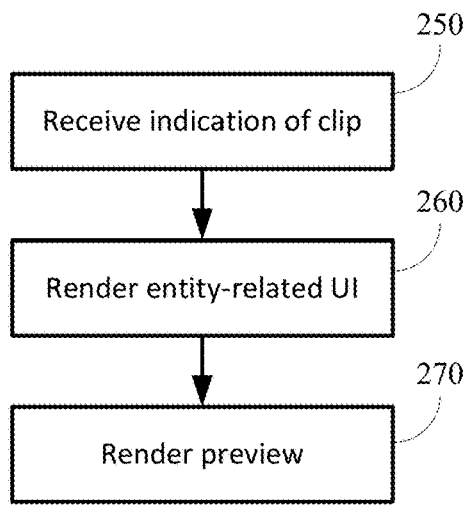
FIG. 2B illustrates an example process flow for a clipper according to an implementation.

FIG. 2B illustrates an example process flow for a clipper according to an implementation. Referring to FIG. 2B, a clipper may receive an indication of a clip (250). The indication may be received through a clipper user interface. The entity may be determined at the client (as part of a process at the clipper) or at the capture service. Entity-related features of the user interface may be rendered once the entity is resolved for the clip (260). One embodiment provides a customized window pane based on a recognized entity. Custom strings can be utilized for different entity types. Some examples are illustrated in FIGS. 6A-6E.

A preview can be rendered for the clip (270), and the preview may show the augmentation available for the clip. When captured through a clipper, a preview can be rendered for the clip within a graphical user interface associated with the clipper. The preview may be rendered in a separate window or pane from the content or within the same document as the content.

In some implementations, a customized view (or format) can be presented based on a recognized entity. In some cases, the entity container structure with the appropriate content for the specified attributes can be arranged in a particular manner. For example, a presentation of a book entity type can include an arrangement that fits within a rectangle (or other shape) of certain proportions with an image of the book cover at one location, a summary of the book in a specified font at another location, the author's name at yet another location, and the ISBN number at a bottom location.

In some cases, a service element may be included at a particular location. This service element may be a graphical representation of, for example, a "buy now" request to launch online bookseller sites or a synopsis request to launch a study guide application. As other examples, a "movie" can include a service element to purchase a ticket, and an "airline ticket" can include a service element that displays up-to-date information on flight status.

Figure 3A:
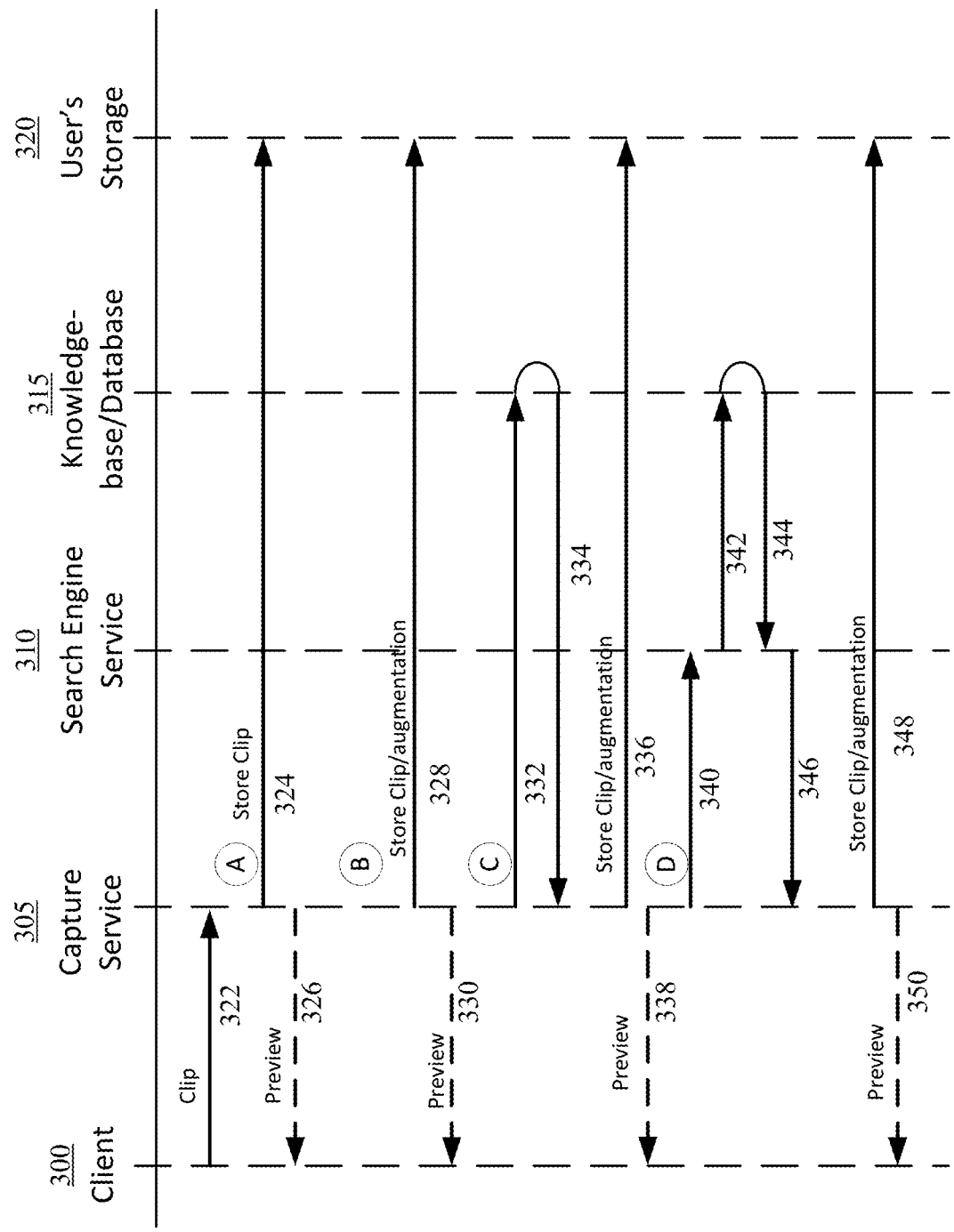
FIGS. 3A and 3B illustrates system architecture diagrams with process flows for certain implementations.
Figure 3B:
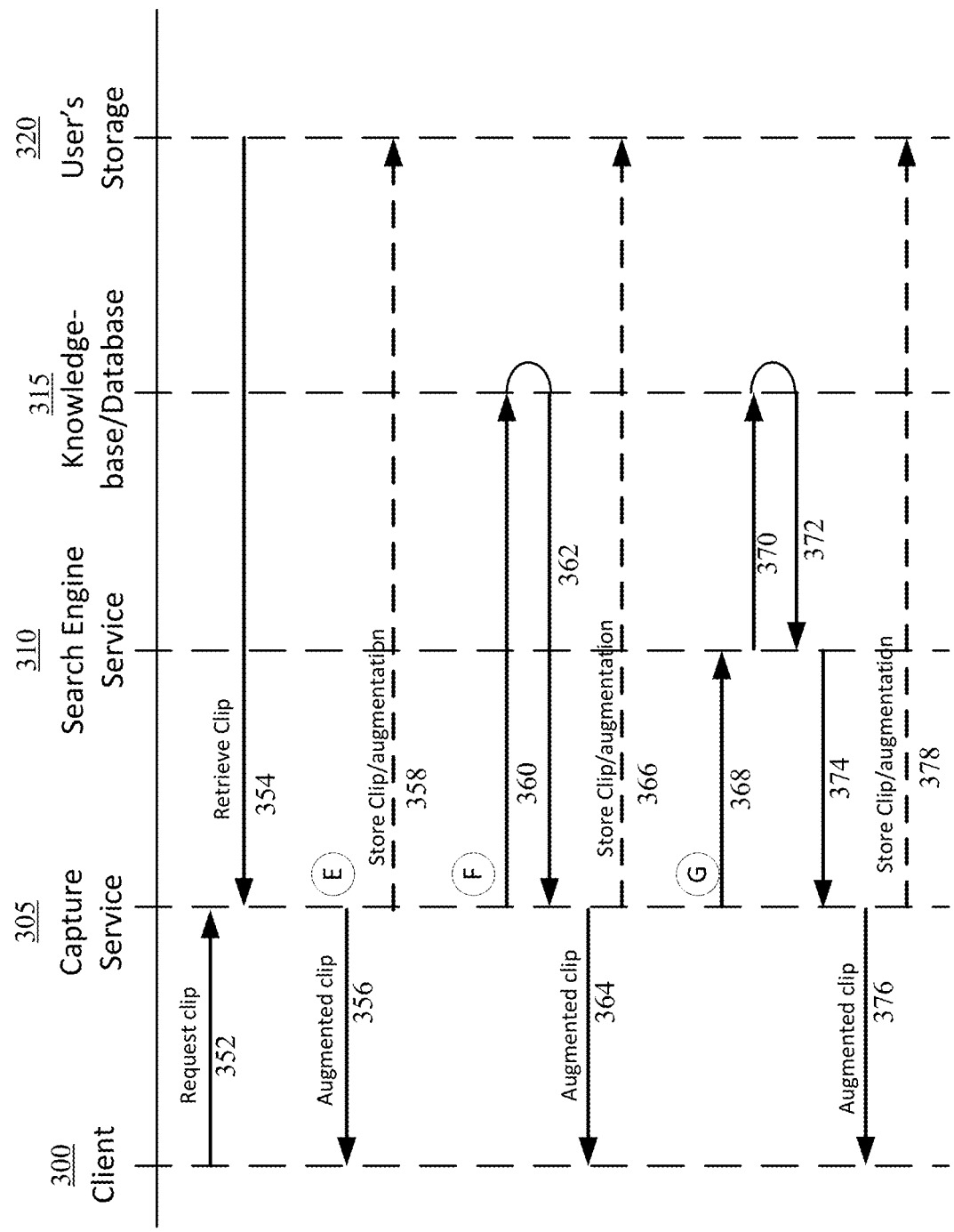

FIGS. 3A and 3B illustrate system architecture diagrams with process flows for certain implementations. The operating environment can include client 300, capture service 305, search engine service (a web data service provided by a search provider) 310, knowledgebase/databases 315, and user's storage 320.

Referring to FIG. 3A, a clip 322 can be sent from a client 300 to a capture service 305. In some cases, the source of the page is sent in its entirety to the capture service. In other cases, a portion of the source is provided, and yet in other cases the URL is sent and the content retrieved at the server (by the capture service 305). In a basic case, as illustrated in case A, the capture service can store the clip (324) without augmentation in the user's storage 320 and in some implementations a preview 326 can be generated at the client 300.

Cases B, C, and D illustrate various configurations for facilitating augmentation. In case B, augmentation can be carried out at the capture service 305, for example, various processes involving removal of advertisements or formatting text for reading. Thus, after receiving the clip 322, the clip and augmentation can be stored (328) and optionally provided as a preview 330.

In one implementation, the capture service 305 may include a database of entities with associated cards (or contact another service that has a database of entities with associated cards) and can retrieve the topic card from this database. A look-up table may be used to get the corresponding card of a specified entity.

For example, in case C, entity recognition and augmentation can be carried out by the capture service 305 through direct access of a knowledge base or database 315. In response to a communication 332 from the capture service 305, data (334) from the knowledgebase/database 315 can be provided to the capture service and used to generate an augmented clip 336, which can be stored in the user's storage 320 and optionally provided for preview 338.

According to an example implementation, the capture service 305 can call a search engine service 310, for example, the Google® or Bing® search engine service, with an entity to request the topic summary or topic card from the Google® or Bing® service.

For example, in case D, when the clip is content from a web page, the entity recognition may have already been performed by a search engine feature. In such cases, the URL of the web page may be sufficient to send to the capture service 305, which requests (340) the entity (or entities) on the page from the search engine service 310. The search engine service 310 may access (342) knowledge base or database(s) 315 (which may be the same or different ones than directly communicated with by the capture service) to retrieve a topic card (344) for the web page. The search engine service 310 may then provide the card 346 (along with any other search results that may be requested by the capture service 305) to the capture service 305. The augmented clip 348 can be stored at the user's storage 320 and optionally provided as a preview 350.

As described, in some cases, a preview may be presented. In other cases, the clipper collects the content and sends the content directly to storage (without a preview).

A preview of the clip can be provided by the capture service to the client and/or the clipper running on the client may render the preview. The preview can be rendered in a preview pane or window in the browser. The preview pane can be part of a clipping user interface in which editing, tagging, and other actions may be accomplished. For example, the user can add a tag or a comment to the clip via the user interface. In addition, the destination for the clip may also be configured from within the user interface. In some cases, a drop-down menu or input field can be used to indicate a specific destination. As an example, a user may select a notebook name or reading collection. A predicted destination may also be presented in the preview pane. For example, using entity recognition and auto-tagging, the clipper, or capture service, may determine that a user is looking for a house and recognizes elements of a webpage related to houses that then get saved to the user's housing notebook. Similarly, when recognizing the entity of a movie, such a clipping could automatically go into the user's movie notebook.

Referring to FIG. 3B, a clip 322 can be sent from a client 300 to a capture service 305. As previously described, in some cases, the source of the page is sent in its entirety to the capture service. In other cases, a portion of the source is provided, and yet in other cases the URL is sent and the content retrieved at the server (by the capture service 305). In the basic case (case A) illustrated in FIG. 3A, the capture service can store the clip (324) without augmentation in the user's storage 320.

Cases E, F, and G illustrate various configurations for facilitating augmentation after the clip (which may or may not have had augmentation performed) is stored. When a user retrieves the clip (such as clip 322) from the user's storage (354) for viewing and/or editing at the client 300, the client 300 may contact the capture service 305 to retrieve a stored clip (via request 352). As illustrated for case E, the capture service 305 can automatically perform augmentation on the clip before providing the clip to the client 300. For example, various processes involving removal of advertisements or formatting text for reading may be carried out. Once the augmentation is performed, the augmented clip 356 can be provided to the client 300 and stored (358) at the user's storage 320.

In one implementation, the capture service 305 may include a database of entities with associated cards (or contact another service that has a database of entities with associated cards) and can retrieve the topic card from this database. A look-up table may be used to get the corresponding card of a specified entity.

For example, in case F, entity recognition and augmentation can be carried out by the capture service 305 through direct access of a knowledge base or database 315. In response to a communication 360 from the capture service 305, data (362) from the knowledgebase/database 315 can be provided to the capture service and used to generate an augmented clip 364, which can be provided to the client 300 and stored (366) in the user's storage 320.

In another implementation, such as illustrated in case G, the capture service 305 can call a search engine service 310, for example, the Google® or Bing® search engine service, with an entity to request the topic summary or topic card from the Google® or Bing® service. The capture service 305 may use a URL associated with the clip to request (368) the entity (or entities) on the page from the search engine service 310. The search engine service 310 may access (370) knowledge base or database(s) 315 (which may be the same or different ones than directly communicated with by the capture service) to retrieve a topic card (372) for the web page. The search engine service 310 may then provide the card 374 (along with any other search results that may be requested by the capture service 305) to the capture service 305. The capture service can use the card 374 (and any other data provided) to augment the clip and provide the augmented clip 376 to the client 300 and store (378) the augmented clip at the user's storage 320.

Figure 4:
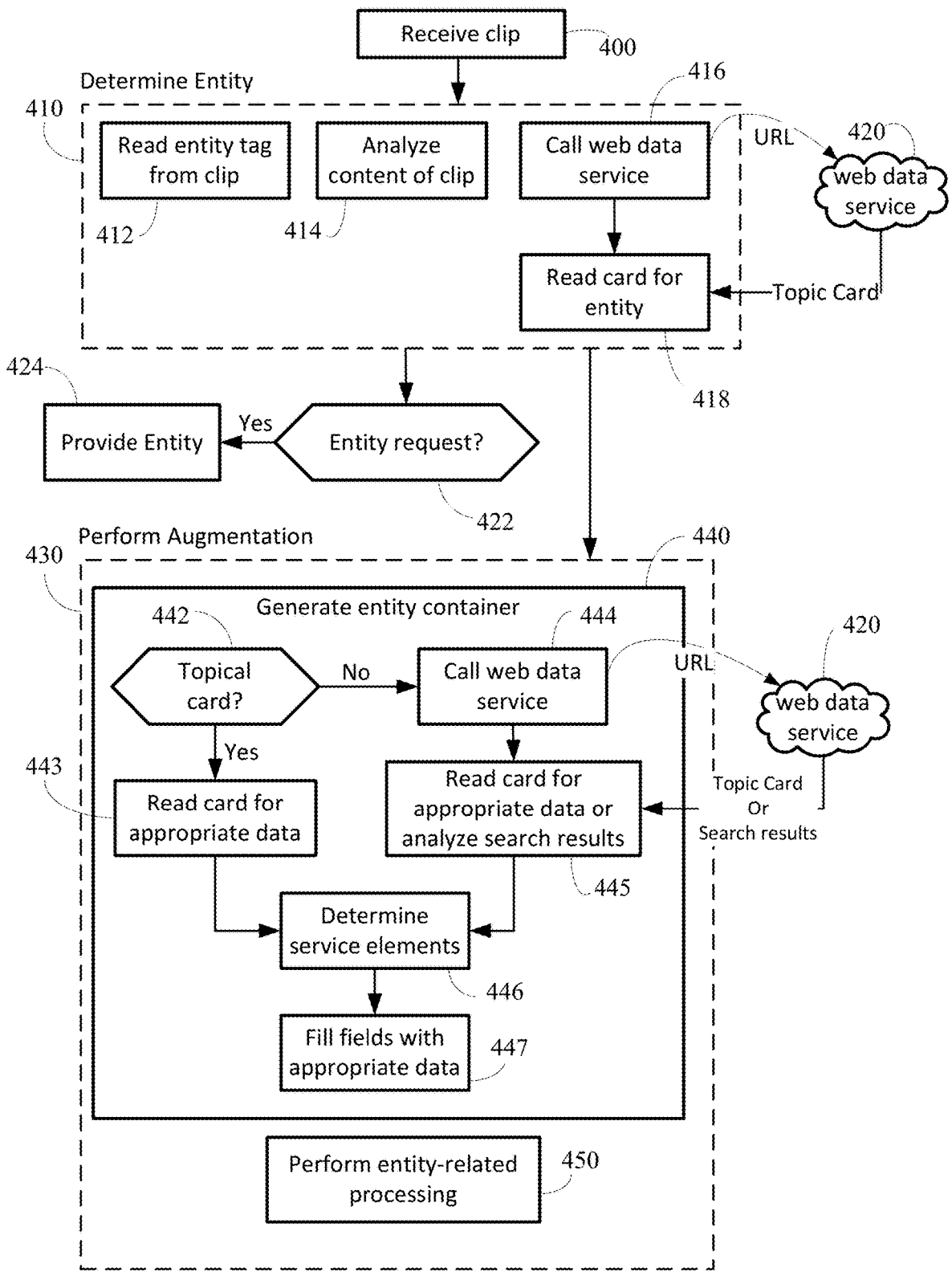
FIG. 4 illustrates an example process flow for a capture service according to an implementation.

FIG. 4 illustrates an example process flow for a capture service according to an implementation. A clip of a web page or other document may be received (400) at the capture service in order to perform augmentation. Once received, the entity or entities of content on the page or other document is determined (410). Determining the entity of an object in a clip may be accomplished by reading an entity tag from the clip (412), analyzing the content of the clip (414), and/or calling a web data service (for example available from a search engine provider) (416) by sending the URL of the clip as part of the request to the web data service 420. In some cases, when analyzing the content of the clip (414), the entity determination can be accomplished by analyzing the HTML dominant object model (DOM) of the clipped web page (or other document). In some cases, when using the topic cards from the web data service 420, the entity can then be determined in operation 418 when the one or more topic cards (the structured and unstructured information about the entity/entities on the page) are received from the web data service 420. If the capture service received an entity request (422), then the entity determined in operation(s) 410 can be provided to the application/device that made the request.

As part of the augmentation process, information received from the web data service (and/or search engine service whether same or different providers) can be used to create an entity container. Information from the clip itself can be used to populate the entity container and facilitate the creation of the entity container.

The creation of an entity container (e.g., "augmentation") may be carried out in parallel to or in serial with entity determination. In some cases, entity determination occurs as a result of or as part of the entity container creation process. In some cases, the result of the entity determination directs the entity container creation process.

As an example, during operation 416, when the capture service calls the web data service 420 with the URL, the web data service 420 can provide a cached version of the properties of the webpage identified by the URL stored in a database of the web data service. The entity determination can be read from the card (418) and the card information can be used to generate the entity container (440). For example, if a topic card is received (442) (because of being requested during operation 416), the card can be read for the appropriate data (443). The entity container may be the card or may be a modified version of the card provided by the web data service.

If the capture service does not yet have the topic card, the capture service can call the web data service 420 with the URL (444), and, in response to receiving the topic card(s) from the web data service, the capture service can read the card for appropriate data (445). In some cases, a card is not available for a URL or the document (or other item received by the capture service) does not have a cached version stored in the database for some reason (e.g., no URL may have been provided or is available).

In the case that no card is available (and even in the case that a card is available), the capture service can call a search service (which may be provided by the same provider of the web data service) and request a search be performed (see also operations 444 and 445).

For example, when the keyword is the name of a composer, the curated card may include a picture of the composer, date of birth, family members, famous works and, in some cases, other composers either commonly searched or of some other relationship to the composer. This type of curated card is currently being used on search engine sites to enhance certain search results; however, certain embodiments can provide this functionality outside of the search engine web site and without requiring a user to enter search terms.

That is, the capture service determines the entity that the user intends to capture from a page, makes the connection to the search service, which may only receive key words, receives the card from the search service, and generates an entity container from the card as well as other information requested and received from a variety of sources across the Internet. For example, service elements may be included in the entity container and upon determining the desired and/or available service elements (446), the fields of the entity container can be filled with the appropriate data (447). The augmentation can also include performing entity-related processing 450. An entity container generated in this manner may be rendered in a preview while the user is on effectively any web page or document.

The capture service can, in addition to relying on search engines, identify key entities itself via natural language processing and related statistical and/or heuristics-based techniques.

Figure 5A:
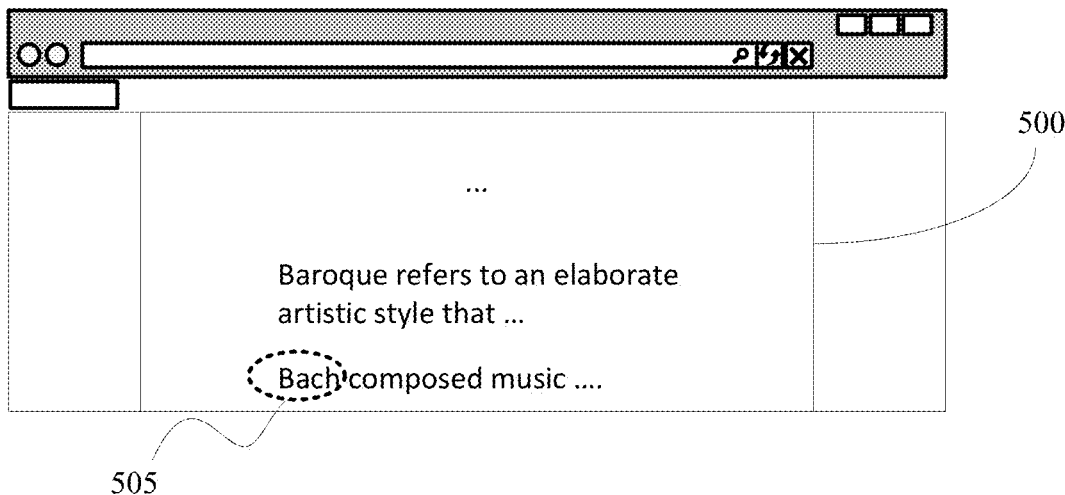
FIGS. 5A and 5B illustrate an example scenario in which a recognized entity in a web clipping can generate an entity container.
Figure 5B:

FIGS. 5A and 5B illustrate an example scenario in which a recognized entity in a web clipping is assigned an entity container. Referring to FIG. 5A, a user may be conducting research on the Baroque period for a school course. While viewing a web page 500, the user may decide to clip the page to a note.

According to an implementation of the automatic augmentation technique, an entity container can be generated for the dominant entity or entities of the web page 500. When invoking the capture service, the dominant feature of the webpage may be determined and this dominant feature associated as a strongly typed entity (also referred to as a "strong entity type"). More than one entity may be recognized on a page.

A dominant entity on the page 500 may be Johann Sebastian Bach (505). The determination of the dominant entity may be performed at the clipper (locally) or at the capture service. In some cases, the user may indicate the entity of interest; whereas in other cases, the entity determination is performed in the background and/or without user input.

The capture service can, in response to determining that the dominant entities on the page include the composer Johann Sebastian Bach, generate an entity container. The clipping can be captured into storage with the entity container(s) for the recognized entity (or entities). The entity containers can be available for strong entity types recognized on a page of a clipping.

The entity container 510 shown in FIG. 5B may be rendered at the user's device as a preview. It should be understood that the entity container shown in FIG. 5B is merely illustrative of elements that may form an entity container and should not be construed as requiring the elements shown or limited only to those shown. Referring to FIG. 5B, the entity container 510 may include the composer's name attribute element 511, a summary attribute element 512, an image attribute element 513, a life span attribute element 514, a relationship/spouse attribute element 515, a children attribute element 517, a parents attribute element 518, and a "listen now" service element 520.

In certain embodiments, the clipper interface can indicate the recognition of a particular entity related to the content being rendered in the viewing pane of the browser or other application. For example, if a user is viewing a website relating to books, the layout, text, or other features of the clipper interface can make it apparent that the clipper recognizes that the user is viewing a web page relating to books.

The clipper can direct content presentation and, optionally, provide the user with additional information. The content presentation may include a simple description of the recognized entity, for example, "Book" or a preview of the entity container for the recognized book on the web page. The additional information could be related to, for example, competitive pricing of books. For example, if the user were clipping information from Amazon.com, the augmented clipper might also automatically provide prices from other book-selling websites.

Once the entity type is recognized—or as part of the process of recognizing the entity type for a clip, the capture service can obtain elements (attribute elements and service elements) that relate to the object of the entity from one or more sources.

According to various implementations, the capture service can provide the relevant information (the elements) in a form suitable for the particular entity type. This form can be a package of elements that make sense in relation to the identified thing (i.e., the entity"). A difference between tagging and entitizing is that determining the one or more entities in a document or on a webpage generates a layout or format specific to the entity as opposed to simply providing additional metadata for the file. Text, audio, images, and video can be captured by the application and the subject of this content can be captured.

In certain implementations, the entity container schema can be configured according to an ontological database or catalog such as available from schema.org—a public repository of schematizing the world. The schema can include a list of properties associated with an object. The list of properties can then be used to get information to fill out the schema. Layout templates may also be included so that the view of the entity container (with filled attributes) may be consistent but can be customized for each client or context (e.g., how the information is presented in the preview pane or on a mobile phone).

In any of the described implementations described, service elements can be included in the augmentation (for example, as part of an entity container). Because the identity of the stored object is known (is an entity) as opposed to HTML, applications that act on such entities can be interfaced with or given access to the object or aspects of the object.

An example of a service element is a calendar event. A calendar service can be implemented to set a reminder or generate a message based on the entity. Reminders can be contextual to the kind of information captured. In some cases, a location service may be incorporated in which a reminder can be sent when a device is within a certain distance of a store or other location. For example, a "remind me when I am in a bookstore" can be arranged through the service element to prompt a user when the user (the user's device) is in a bookstore to get a book; or a "remind me when I am at the movie theater or on a ticket site" to prompt the user to see a movie or purchase a ticket.

Additional functionality could also be set through the service element. For example, a recipe entity can include a service element that generates a shopping list when the user is in a grocery store.

Although an "article" may not be a strong entity, the topic of the article can be determined and additional services enabled through one or more service elements of the article entity container. For example, related news may be retrieved based on a common topic. As another example, updates to the topic (e.g., a newer article or a correction to the article) may be presented or recommended.

The strong entity types assigned by the augmentation of the clipping available through the capture service enable additional functionality to be presented.

From a notebook application, permissions to third party applications may be available based on entity type. For example, the notebook application can be configured to permit a reader application to access "books" for tagging, reading, or other specified actions. Instead of permissions based on hierarchy (e.g., specific to a page), permissions can be set permissions based on "entity." This enables access to elements of a page instead of a page as a whole. The elements that are accessed are the elements marked as a strong object, not necessarily the other information on the page (unless permissions are granted for that other information and/or the other information on the page is the attributes of the entity).

Because the entity is stored in the form of an entity container, accessing the entity container (based on permissions to a particular entity type) avoids accessing the user's private information. Instead, the information from the entity container is public information obtained from sources across the Internet and generated by a search engine. For example, a user's note may discuss character development in a novel. The novel may be marked as a strongly typed entity of a "book". Because the novel is marked as a book, the entity container for that novel is stored with the page or objects on the page of the note. Then, when an application granted access to the books in the note accesses the books, the information received by that application is the entity container and not the discussion of character development or other text on the page of the note.

What follows are a number of screen shots associated with aspects of the subject disclosure as provided with respect to a computing device. Such screen shots are merely exemplary and provided to graphically depict at least one embodiment of aspects of the disclosure. Of course, the subject disclosure is not intended to be limited to the location or presentation of graphical elements provided since there are a myriad of other ways to achieve the same or similar result.

It should be understood that these case examples are meant for illustrating how certain features may be implemented and should not be construed as limiting in layout, functionality, features, or scope.

Figure 6A:
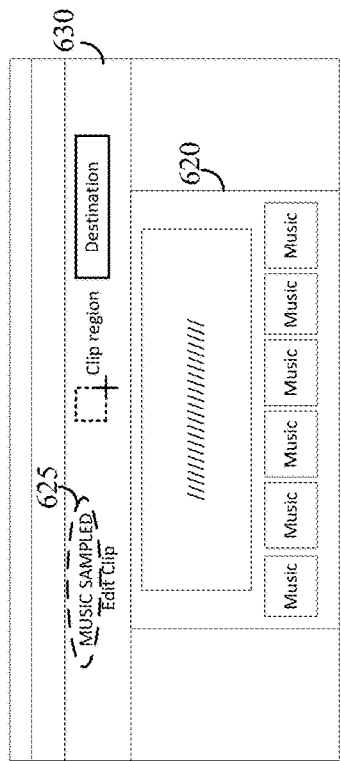
FIGS. 6A-6E illustrate example entity designators.

Entity-related UI may be rendered. For example, custom strings can be utilized for different entity types. FIGS. 6A-6E illustrate example entity designators. Once a dominant entity is recognized from a webpage being clipped, a designated response may be displayed to the user. Referring to FIG. 6A, a webpage 605 having a dominant entity of a movie can result in a designated response 610 referencing the entity type "movie" in the clipper pane 615. Thus, if the user clips content that contains a recognized entity of a movie, the displayed string can indicate "Movie Watchlisted" as shown in FIG. 6A.

Figure 6B:
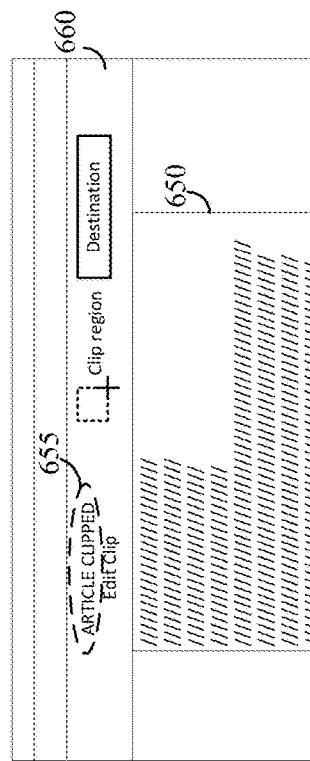

In FIG. 6B, a webpage 620 having a dominant entity of a song can result in a designated response 625 referencing the entity type "music" in the clipper pane 630. For example, "Music Sampled!" could be the message for a music site.

Figure 6C:
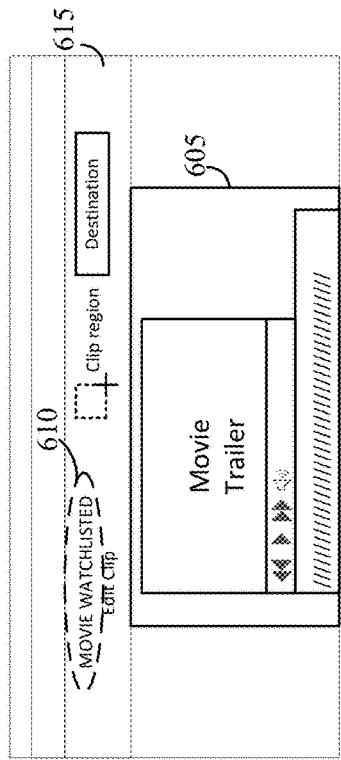

In FIG. 6C, a webpage 635 having a dominant entity of a book can result in a designated response 640 referencing the entity type "book" in the clipper pane 645. If a user clips content that contains a book, the displayed string can indicate "Book Shelved!" as illustrated in FIG. 6C.

Figure 6D:
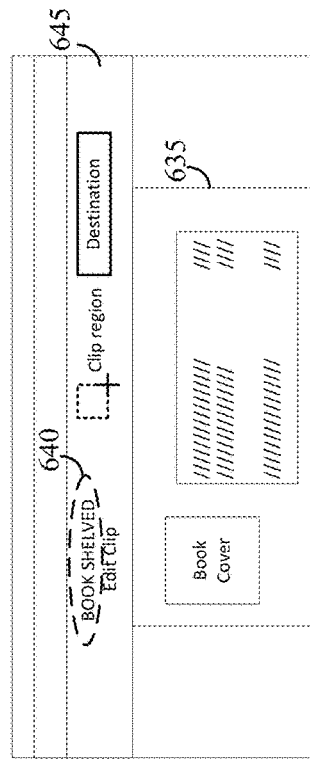

In FIG. 6D, a webpage 650 having a dominant entity of an article can result in a designated response 655 referencing the entity type "article" in the clipper pane 660. For example, "Article Clipped" may be displayed when the content is determined to be an article entity.

Figure 6E:
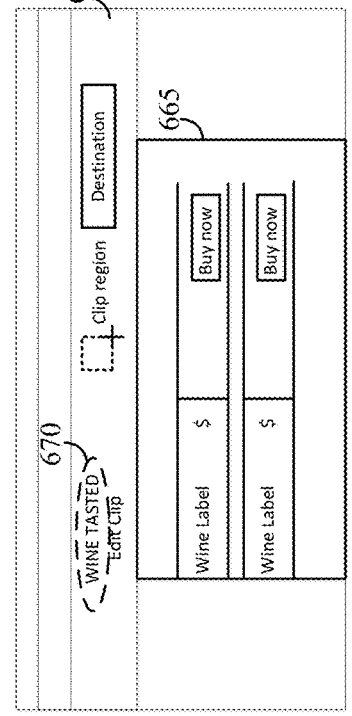

In FIG. 6E, a webpage 665 having a dominant entity of wine can result in a designated response 670 referencing the entity type "Wine" in the clipper pane 675. For example, after clipping at a wine website, the message "Wine Tasted!" can be displayed.

In each example, the same information is being conveyed—a confirmation of the identity of the "thing" to which the site pertains and that the material is clipped and saved.

FIGS. 7A-7C illustrate a scenario for a notebook application that may be implemented on a mobile device 700 having a web browser client 710.

Accessing and launching the application used to share content may be carried out by a touch, mouse click, voice request or other input or gesture. In another case, this application may be launched programmatically. FIG. 7A illustrates an example user interface for launching the application used to share content through a touch input. For example, as shown in FIG. 7A, a user of a mobile device 700 may enter a URL in a web browser client 710 and then select to share the webpage 720 to a note (750).

As shown in FIG. 7B, a preview pane (or pop-up) 760 can open so that a user can view a preview of the content being inserted into the application used to share content. The application used to share content can be a notebook application, a reader application, a productivity application or any suitable application available via the capture service. In addition, the preview pane may include features for a user to control where the content is assigned (e.g., the name of the note, the account associated with the note). A user may select (770) to include the content (780), which is shown in the preview pane 760. An option, such as a button, checkbox, or other input field, can be provided to the user to enable the user to select to include the screenshot.

When the application used to share content is the notebook application, the captured content can be viewed in the note when the notebook application is opened. Once the content 780 is included in the note 790, the user can annotate on the screenshot, such as shown in FIG. 7C.

Figure 8A:
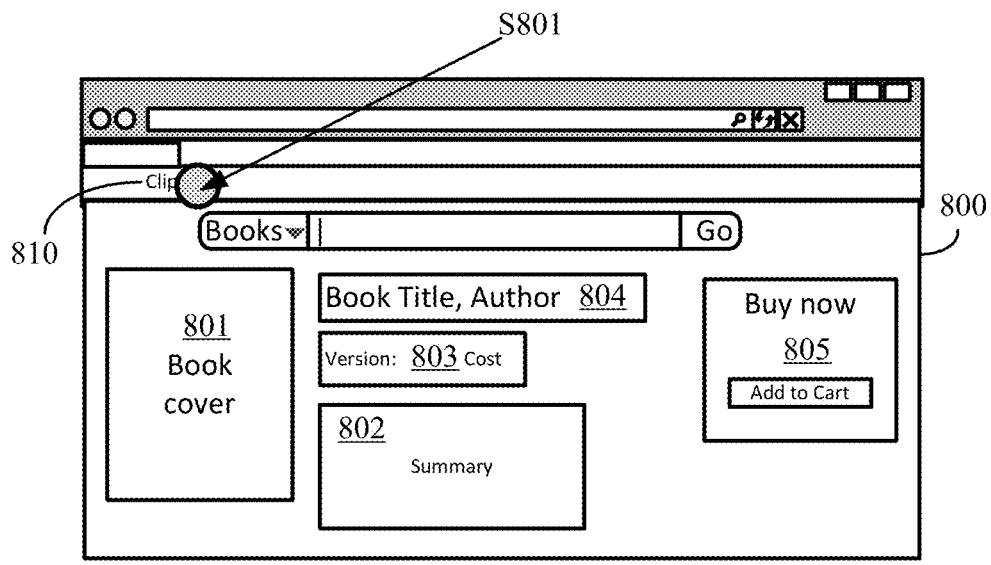
FIGS. 8A-8E illustrate user interfaces for a process flow of an example scenario according to an implementation.

FIGS. 8A-8E illustrate user interfaces for a process flow of an example scenario according to an implementation. In an example scenario, a user, Joy, is browsing an online bookstore and comes across a book she would like to read. Joy can use a clipping tool to clip the book information into her notebook application. For example, as shown in FIG. 8A, Joy may be viewing a webpage 800 for a book on which a book cover 801, summary 802, version(s) and cost 803, and book title and author 804 may be presented. The book may be available for purchase with the transaction available through a purchase link 805. When Joy selects (S801) to clip the page (via clipper 810). The clipping may be of the page, a region of the page and/or a dominant entity of the page.

Figure 8B:
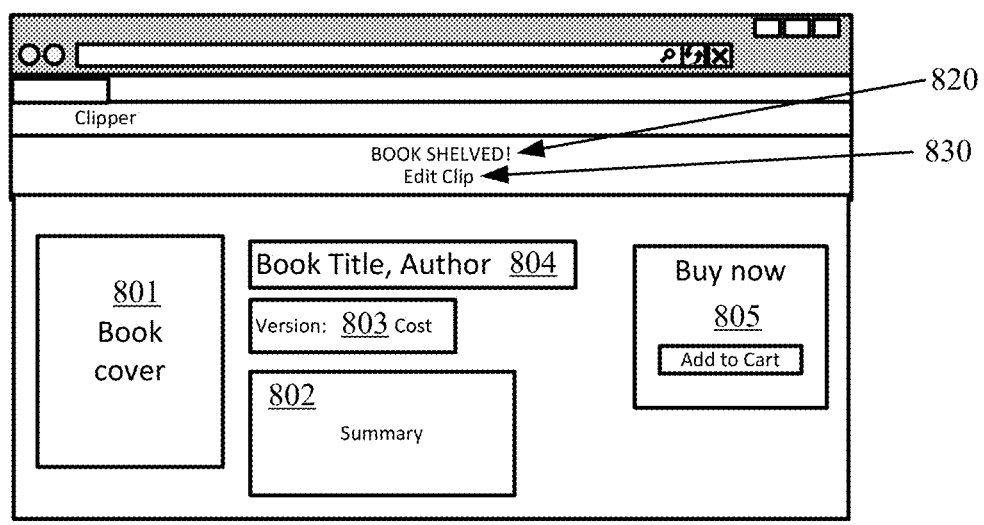
Figure 8C:
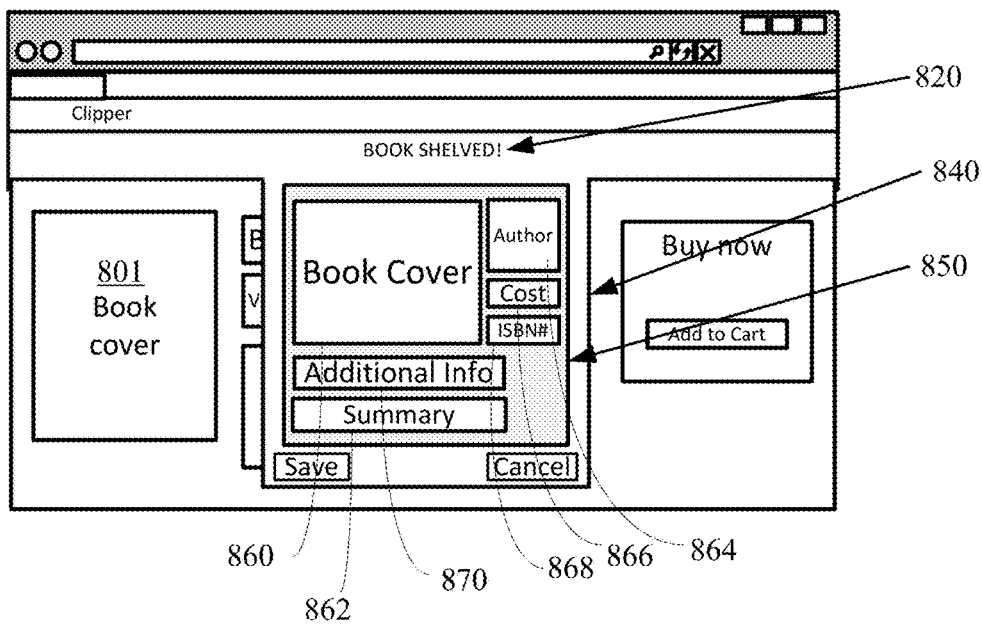
Figure 8D:
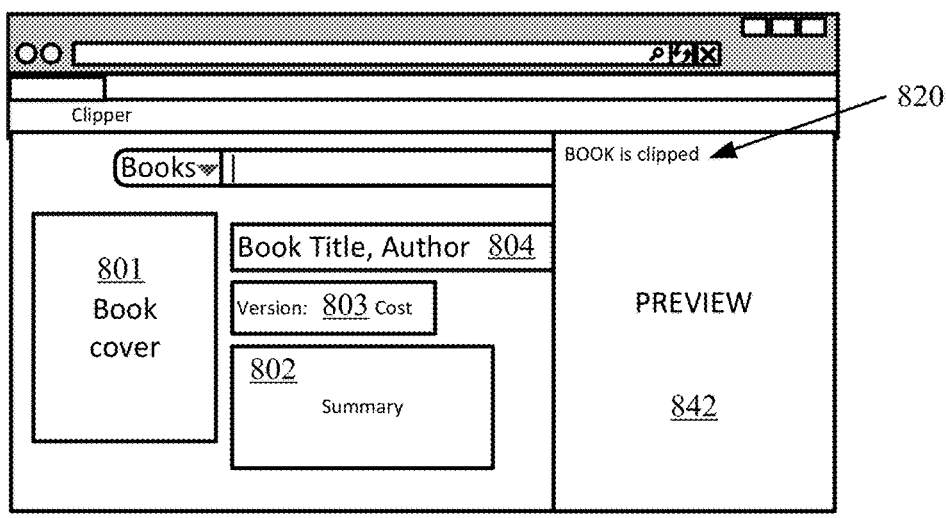
Figure 8E:
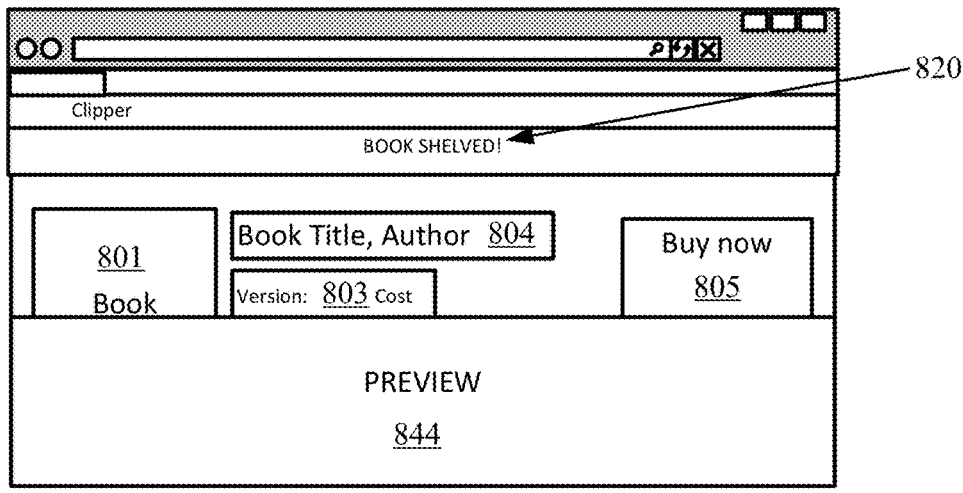

As shown in FIGS. 8B and 8C, in response to clipping the page 800, because the capture service recognizes the dominant entity of the page 800 as being a book, the clipper can display a designated response 820 indicating that the recognized entity is a book. The clipping may be edited from within the clipper, for example, an "edit clip" command may be selected or modifications may be made from within a preview pane (e.g., preview pane 840). The preview pane 840 may or may not be automatically displayed when clipping a page (or portion of the page). FIGS. 8D and 8E illustrate two of many alternate preview pane configurations. FIG. 8D shows a right panel preview pane 842 and FIG. 8E shows a bottom panel preview pane 844.

Returning to FIG. 8C, a book entity container 850 can be displayed in the preview pane 840. The book entity container may provide attributes including, but not limited to, a book cover 860, summary 862, author information 864, cost 866, ISBN 868, and additional information 870. Some of the information for the attributes may be obtained from the webpage content itself. Other information for the attributes may be obtained from one or more external sources.

Figure 9A:
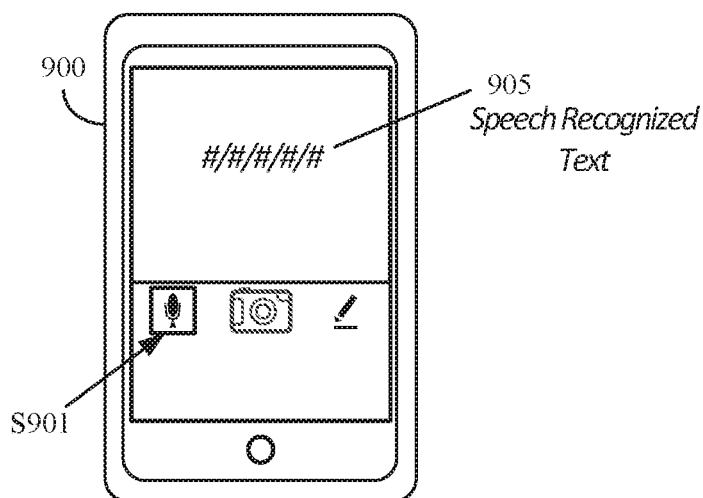
FIGS. 9A-9G illustrate an example scenario according to an implementation.

A user case sequence is illustrated in FIGS. 9A-9G. Referring to FIG. 9A, a user may be talking with a friend who tells her that she must read a certain book. So the user speaks into her cell phone 900 to record (S901) the name in her notebook application as a quick note. In some cases, speech recognized text 905 can be displayed within the note. After receiving this input, the notebook application can (as part of a synching process, in response to a command by the user, as part of some automated process activated by the receipt of content into the notebook application, or other reason) access or call the capture service to request entity recognition.

In this example case, the capture service may indicate that the entity may be a book or a movie and, as a result, the recorded name may have a marker attached indicating that the entity may be the book or the movie (and optionally the corresponding confidence values).

Figure 9B:
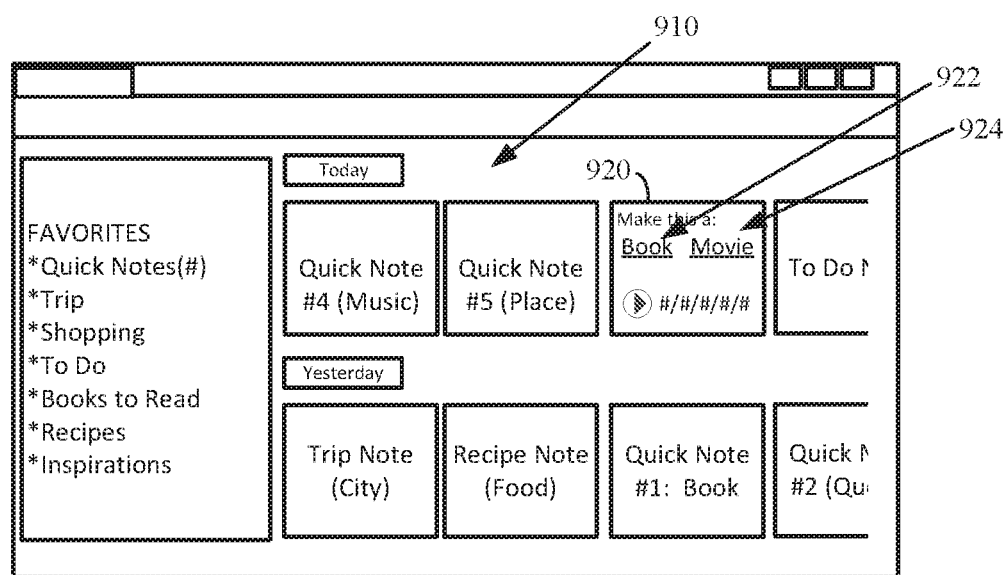

Then, referring to FIG. 9B, when the user opens her notebook application 910, the quick note entry 920 can appear. Because the content of this quick note resulted in two possible entity types, the user can, in this example, select the entity type, book 922 or movie 924, intended for the content.

Figure 9C:
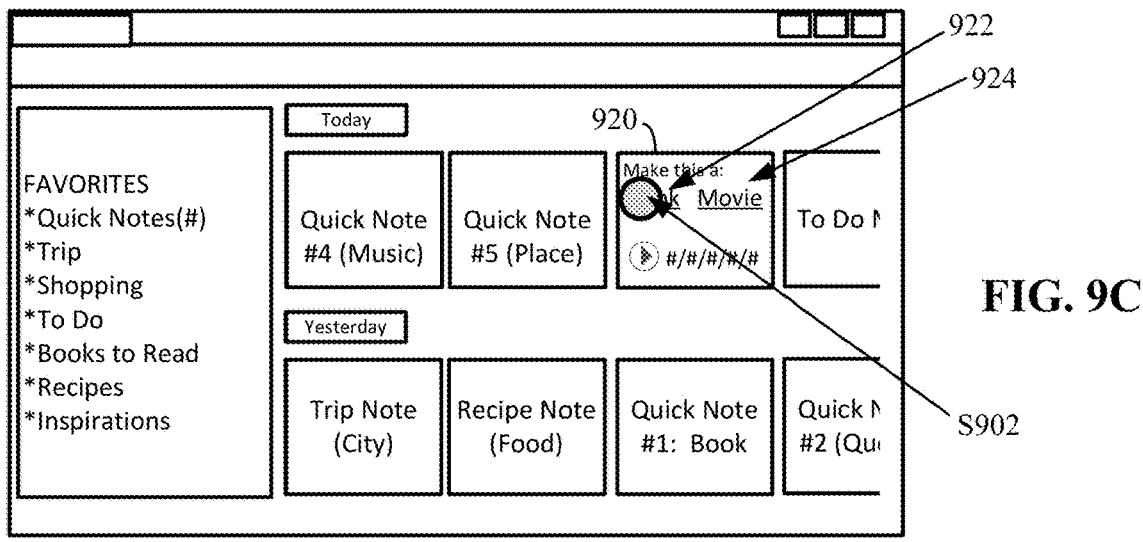
Figure 9D:
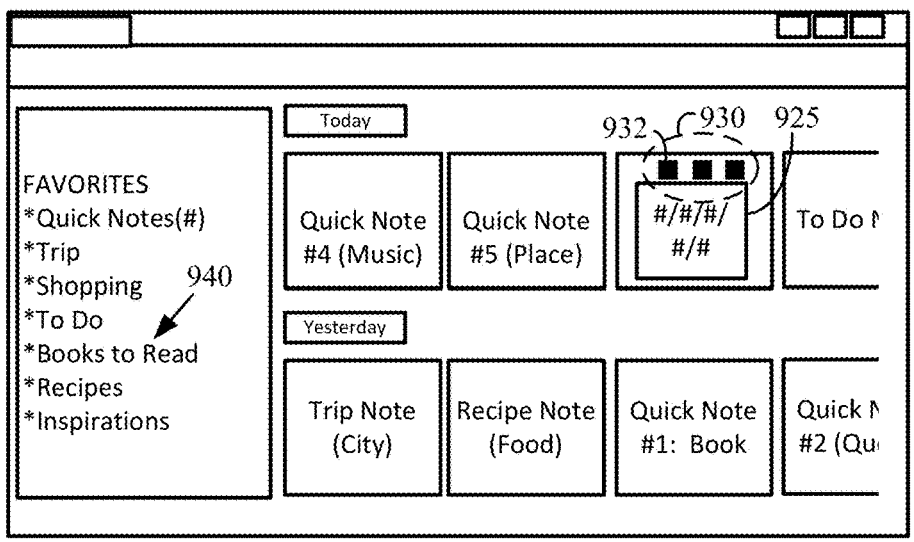

As shown in FIG. 9C, the user selects "book" (S902). This selection can mark the quick note content with the entity marker of "book," which can result in the container "book" being applied to the content. The application of the container can include the notebook application requesting a book container for the named book from the capture service. For this example, as shown in FIG. 9D, when a "book" is recognized in the notebook application, a book cover 925 (received as part of the book container) can be displayed and certain functions 930 may be available to the user, for example, the book can be indicated as being able to be moved 932 to a notebook of books to read 940.

In some implementations, the marking of "book" can also enable another application (which may be a third party application), such as a reader to perform an action on the content in the notebook application. This action can be "to read," for example to determine the books named in the notebook and get the text from another source so that when the user opens the reader, the book can be available for reading. Similarly, a student study guide application may read the books named in the notebook and present a pamphlet style or synopsis for the user. In one example where a study guide application has permission to access "books" in a note, a user taking notes during class within the notebook application may either have the entity recognition occur automatically or upon the command (for example by selection of text or graphical user interface element of the notebook application) by a user. When a "book" entity is recognized from the note (because of a dominant entity determination that may be carried out at the client or via a capture service the client communicates with), the "book" can be stored. The "book" may be stored separately from the note or as a marker or tag for the note.

In further implementations, the entity container can be obtained and stored as well. Because the study guide application can access "books," and may also access the storage space to which the note (with book marker) or the "book" (separately) is stored, the study guide application can provide a synopsis to the user for that book. This may occur, for example, while the user is in class and taking notes or at a later time when the user accesses the study guide application.

These extended actions can be possible because of the marking of content with a strongly typed entity.

As one example, a book recommendation application (e.g., a social network related to discussing books) can be linked to a user's notebook application. When a book is rated on the book recommendation application, a book entity for this book can added to a "Books I've read" list in the notebook application so that when books are searched in the notebook, the recommended book can automatically be included in the notebook with relevant information. Conversely, when a book is added to the notebook application, the book may be marked as "Want to read" on the book recommendation application.

Figure 9E:
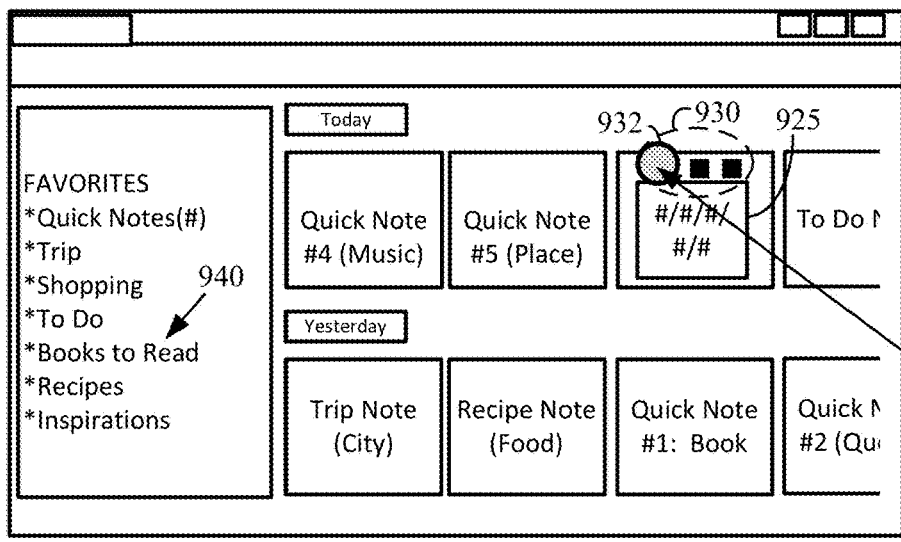
Figure 9F:
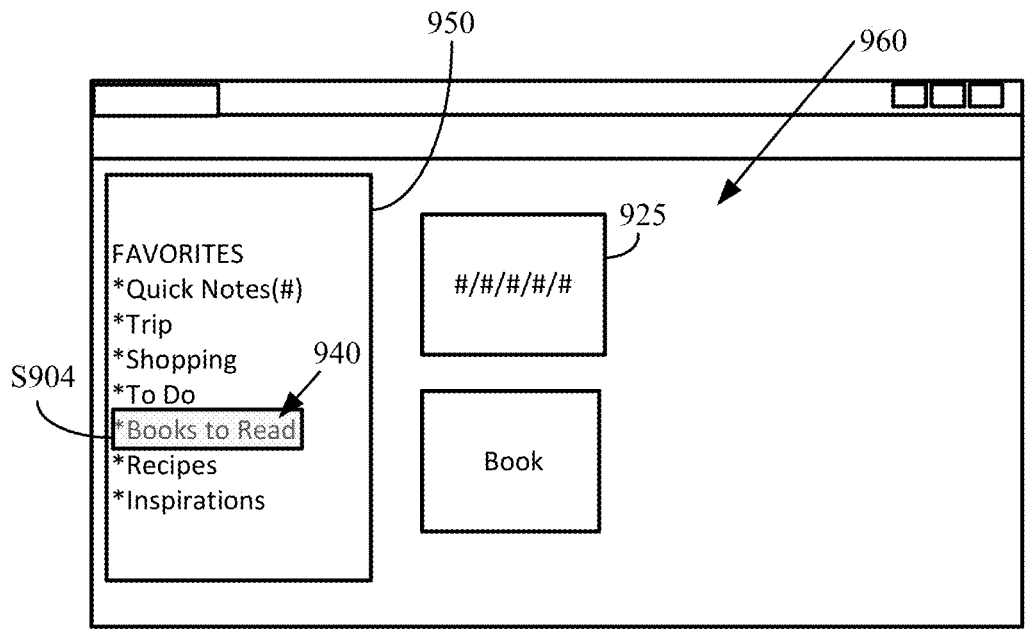
Figure 9G:
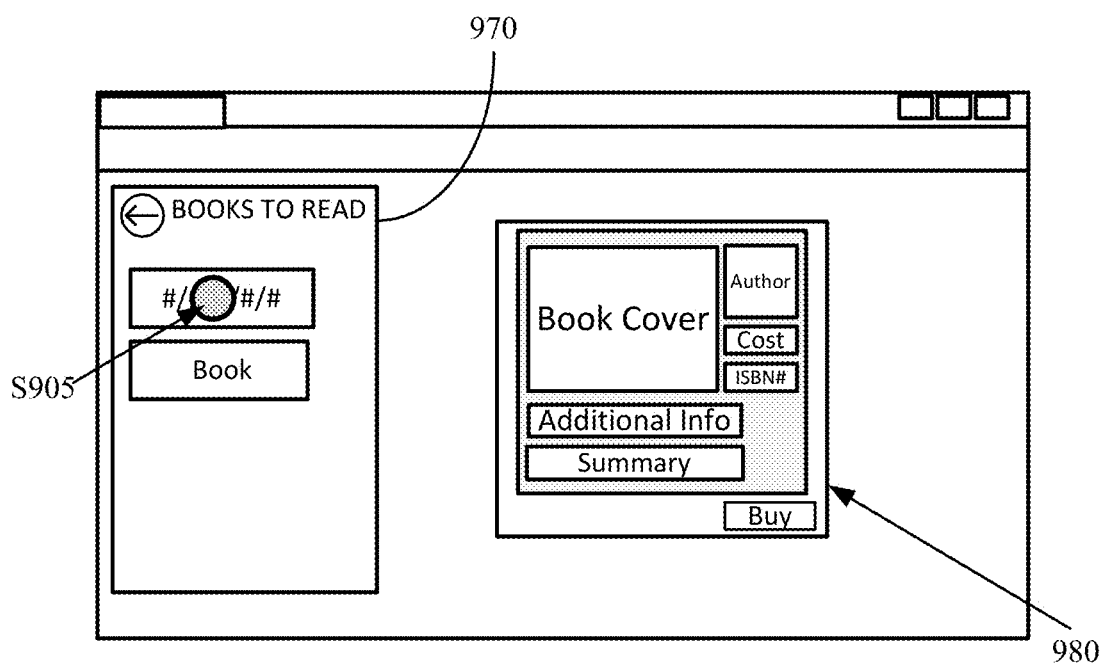

Referring to FIG. 9E, the user may select (S903) the function 932 for moving the item to the books to read 940 file. A "books to read" preview 960 may be available when the "books to read" 940 item on the menu 950 is initially selected (S904) as a filter as shown in FIG. 9F. Then, referring to FIG. 9G, after the user selects (S904) "books to read" 940 from the menu 950, the books to read page is displayed and the user can select the named book from a menu 970. In response to receiving the named book selection (S905), the book container 980 can be displayed. The container 980 can include the genre, the star rating, and a brief description of the book, all displayed without leaving the notebook application. In some implementations, actions may be taken on the item from the note. For example, in some cases, a "buy" button may also be included that can link back to one or more online retailers. In some cases a "read" button or other task related selection may be included so that the user can distinguish between books read and books to be read without having to delete the books from the notebook. The book container 980 can be the same or similar to the book container preview 850 shown in FIG. 8C.

Figure 10:
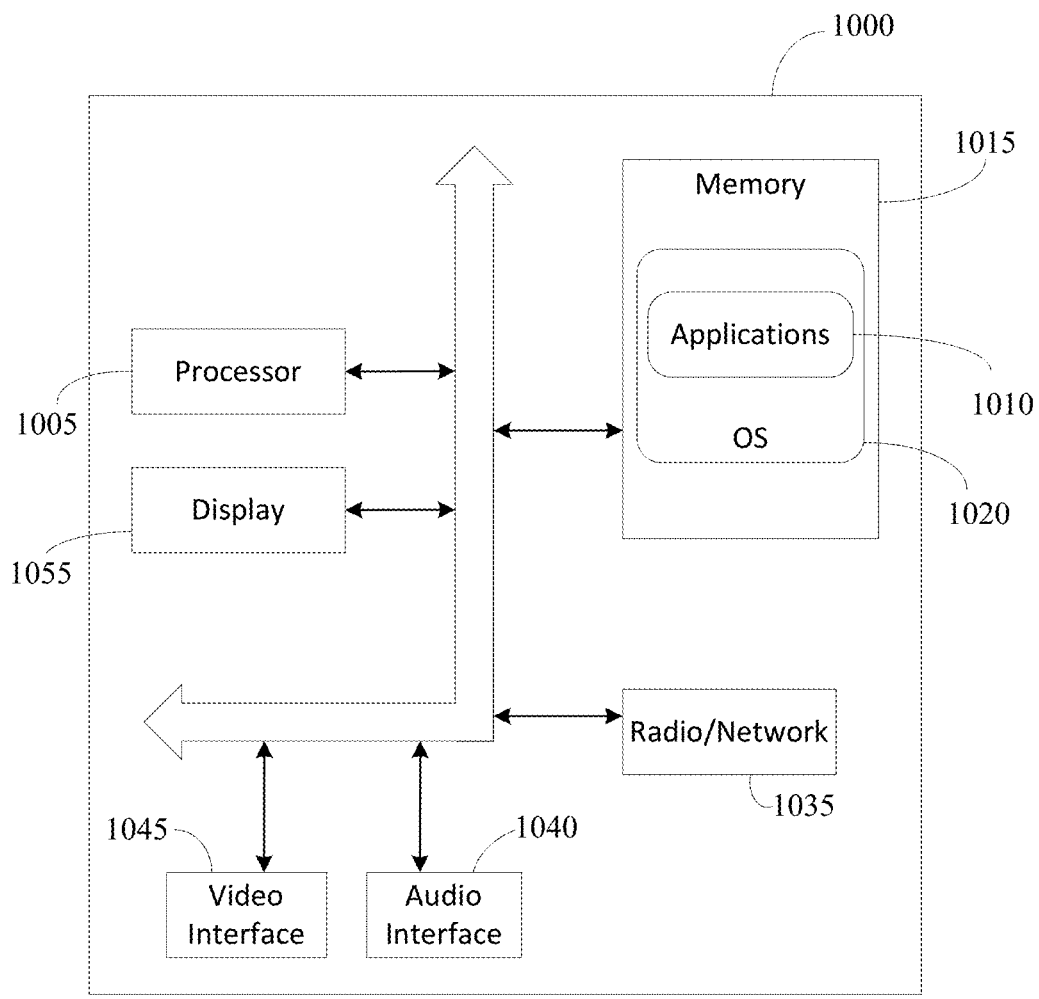
FIG. 10 is a block diagram illustrating components of a computing device used in some embodiments.

FIG. 10 is a block diagram illustrating components of a computing device used in some embodiments. For example, system 1000 can be used in implementing a computing device embodying the client(s) 100, 500, 900, and the like. It should be understood that aspects of the system described herein are applicable to both mobile and traditional desktop computers, as well as server computers and other computer systems. Accordingly certain aspects described with respect to system 1000 are applicable to server(s) on which the capture services (e.g., capture services 115, 505) are carried out.

For example, system 1000 includes a processor 1005 that processes data according to instructions of one or more application programs 1010, and/or operating system (OS)

1020. The processor 1005 may be, or is included in, a system-on-chip (SoC) along with one or more other components such as network connectivity components, sensors, video display components.

The one or more application programs 1010 may be loaded into memory 1015 and run on or in association with the operating system 1020. Examples of application programs include phone dialer programs, e-mail programs, information management programs, word processing programs, Internet browser programs, messaging programs, game programs, notebook applications and the like. Other applications may be loaded into memory 1015 and run on the device, including various client and server applications.

Examples of operating systems include Symbian® OS, Windows® phone OS, Windows®, Blackberry® OS, Apple® iOS®, and Android® OS. Other operating systems are contemplated.

System 1000 may also include a radio/network interface 1035 that performs the function of transmitting and receiving radio frequency communications. The radio/network interface 1035 facilitates wireless connectivity between system 1000 and the "outside world," via a communications carrier or service provider. Transmissions to and from the radio/network interface 1035 are conducted under control of the operating system 1020, which disseminates communications received by the radio/network interface 1035 to application programs 1010 and vice versa.

The radio/network interface 1035 allows system 1000 to communicate with other computing devices, including server computing devices and other client devices, over a network.

In various implementations, data/information stored via the system 1000 may include data caches stored locally on the device or the data may be stored on any number of storage media that may be accessed by the device via the radio/network interface 1035 or via a wired connection between the device and a separate computing device associated with the device, for example, a server computer in a distributed computing network, such as the Internet. As should be appreciated such data/information may be accessed through the device via the radio interface 1035 or a distributed computing network. Similarly, such data/information may be readily transferred between computing devices for storage and use according to well-known data/information transfer and storage means, including electronic mail and collaborative data/information sharing systems.

An audio interface 1040 can be used to provide audible signals to and receive audible signals from the user. For example, the audio interface 1040 can be coupled to a speaker to provide audible output and to a microphone to receive audible input, such as to facilitate a telephone conversation. System 1000 may further include video interface 1045 that enables an operation of an optional camera (not shown) to record still images, video stream, and the like. The video interface may also be used to capture certain images for input to a natural user interface (NUI).

Visual output can be provided via a display 1055. The display 1055 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 1055 may be a touchscreen display. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as software, code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. In no case do "computer-readable storage media" consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Certain aspects of the invention provide the following non-limiting embodiments:

Example 1

A method of automatically augmenting content through augmentation services, comprising: invoking a service to get an entity determination based on content; and receiving a determined entity and an entity container comprising an object of the content and one or more attributes of the object.

Example 2

The method of example 1, wherein invoking the service comprises sending a uniform resource locator (URL), the content being at least a portion of a web page at the URL.

Example 3

The method of examples 1 or 2, wherein the determined entity is at least one dominant entity of the web page.

Example 4

The method of any of examples 1-3, wherein invoking the service comprises sending content of a webpage to the service.

Example 5

The method of any of examples 1-4, wherein at least one of the one or more attributes of the object is obtained from a source separate from the content.

Example 6

The method of any of examples 1-5, wherein the content is or includes audio.

Example 7

The method of any of examples 1-6, wherein invoking the service comprises sending a document to the service, the content being at least a portion of the document.

Example 8

The method of any of examples 1-7, further comprising assigning the determined entity to the content as a marker and storing the entity container as metadata of the content.

Example 9

A system for automatically augmenting content comprising: a clipper user interface embodied on a computer readable storage medium for execution on a computing device and configured to: receive an indication of content for collection; invoke a capture service to request augmentation based on an entity assigned to the content; and receive the augmentation.

Example 10

The system of example 9, wherein the augmentation is text of the content in a reading format.

Example 11

The system of examples 9 or 10, wherein the augmentation includes an entity container comprising an object described by the content and at least one attribute.

Example 12

The system of any of examples 9-11, wherein the augmentation comprises a plurality of entity containers.

Example 13

The system of examples 11 or 12, wherein the entity container further comprises at least one service element associated with a service that invokes the service in response to being selected.

Example 14

The system of example 13, wherein the at least one service element comprises a link for purchasing the object.

Example 15

The system of examples 13 or 14, wherein the at least one service element comprises a link to set a reminder.

Example 16

The system of any of examples 9-15, wherein the clipper user interface is further configured to display a preview of the augmentation.

Example 17

The system of example 16, wherein the augmentation comprises an identification of the entity to which the augmentation is based.

Example 18

The system of examples 16 or 17, wherein the preview of the augmentation comprises an indication of the entity to which the augmentation is based.

Example 19

The system of any of examples 16-18, wherein the clipper user interface is further configured to receive an indication from the capture service of at least one entity recognized in the content.

Example 20

The system of example 19, wherein the clipper user interface is further configured to present the at least one entity recognized in the content and receive a selection of one of the at least one entity recognized in the content to assign to the content.

Example 21

A method of facilitating automatic augmentation of content, comprising: determining an entity of an object in a document; generating an entity container for the object; and assigning the entity as a marker for the object in the document.

Example 22

The method of example 16, wherein the document comprises a web page.

Example 23

The method of examples 21 or 22, wherein determining the entity comprises invoking a search engine service to request a topic card.

Example 24

The method of any of examples 21-23, further comprising: identifying service elements available for the entity, wherein generating the entity container for the object comprises assigning at least one service element to the entity container.

Example 25

The method of any of examples 21-24, further comprising: performing entity-related processing on the document in response to determining the entity of the object in the document.

Example scenarios have been presented to provide a greater understanding of certain embodiments of the present invention and of its many advantages. The example scenarios described herein are simply meant to be illustrative of some of the applications and variants for embodiments of the invention. They are, of course, not to be considered in any way limitative of the invention.

It should be understood that the examples and embodiments described herein are for illustrative purposes only and that various modifications or changes in light thereof will be suggested to persons skilled in the art and are to be included within the spirit and purview of this application.

What is claimed is:

1. A method of automatically augmenting content through augmentation services, comprising:
   displaying content at a client device;
   receiving, at the client device, an indication of a user-selected content from the content being displayed at the client device, the user-selected content comprising one or more objects, the one or more objects each referring to a tangible form of a corresponding entity;
   in response to receiving, at the client device, the indication of the user-selected content, invoking a service to get an entity determination based on the user-selected content by communicating the user-selected content to the service with a request for the entity determination;
   receiving, at the client device, a determined entity and an entity container from the service, the entity container comprising one of the one or more objects of the user-selected content that refer to the tangible form of the determined entity,
   wherein the entity container further comprises a package of information having a structured schema based on the determined entity, the structured schema for one type of determined entity being different than that for another type of determined entity, wherein the structured schema comprises one or more attributes of the one of the one or more objects, and wherein information of the package of information is assigned to corresponding attributes of the one or more attributes;
   determining an entity-related user interface corresponding to the determined entity, the entity-related user interface providing a customized user interface layout based on the determined entity, the customized user interface layout for one type of determined entity being different than that for another type of determined entity;
   assigning the information of the package of information to locations of the entity-related user interface based on the customized user interface layout, wherein each location corresponds to an attribute of the one or more attributes and the information corresponding to that attribute is assigned to that location; and
   rendering, at the client device, the entity-related user interface.

2. The method of claim 1, wherein invoking the service comprises sending a uniform resource locator (URL), the content being at least a portion of a web page at the URL.

3. The method of claim 2, wherein the determined entity is at least one dominant entity of the web page.

4. The method of claim 1, wherein invoking the service comprises sending content of a webpage to the service.

5. The method of claim 1, wherein at least one of the one or more attributes of the object is obtained from a source separate from the content.

6. The method of claim 1, wherein the content is audio.

7. The method of claim 1, wherein invoking the service comprises sending a document to the service, the content being at least a portion of the document.

8. The method of claim 1, further comprising assigning the determined entity to the content as a marker and storing the entity container as metadata of the content.

9. The method of claim 1, wherein the entity container further comprises at least one service element associated with a service that invokes the service in response to being selected.

10. The method of claim 9, wherein the at least one service element comprises a link for purchasing an object.

11. The method of claim 9, wherein the at least one service element comprises a link to set a reminder.

12. The method of claim 1, wherein the entity container contains one or more custom strings based on the determined entity.

13. The method of claim 1, wherein the determined entity is a strong entity type having at least one specified attribute and not being dependent on another entity.

14. The method of claim 1, wherein the determined entity is a book; wherein the entity container comprises a schema with one or more attributes of the book; wherein the one or more attributes of the book comprises at least one of a genre, a title of the book, an International Standard Book Number, a name of one or more authors, an image of a cover of the book, a star rating, a brief description of the book, or a link to purchase the book.

15. The method of claim 1, wherein the determined entity is a movie; wherein the entity container comprises a schema with one or more attributes of the movie; wherein the one or more attributes of the movie comprises at least one of a genre, a title of the movie, a name of one or more directors, a name of one or more actors, an image of a movie poster, a star rating, a brief description of the movie, a link to view a trailer of the movie, or a link to purchase the movie.

16. The method of claim 1, wherein the determined entity is a song; wherein the entity container comprises a schema with one or more attributes of the song; wherein the one or more attributes of the song comprises at least one of a genre, a title of the song, a star rating, a name of one or more artists, a name of one or more composers, an image of an album artwork, a link to listen to a snippet of the song, or a link to purchase the song.

17. The method of claim 1, wherein the determined entity is a product; wherein the entity container comprises a schema with one or more attributes of the product; wherein the one or more attributes of the product comprises at least one of a product type, a title of the product, a manufacturer of the product, an image of the product, a seller of the product, a brief description of the product, a price of the product, a link to purchase the product.

18. The method of claim 1, wherein the determined entity is an article; wherein the entity container comprises a schema with one or more attributes of the article; wherein the one or more attributes of the article comprises at least one of a genre, a title of the article, a name of one or more authors, a headline of the article, a link to view the article.

19. A system for automatically augmenting content comprising:
a clipper user interface embodied on a computer readable storage medium for execution on a computing device and configured to:
display the clipper user interface alongside content presented on a viewing pane of a web browser or application;
receive, at the clipper user interface, an indication of a user-selected content for collection from the content presented on the viewing pane, the user-selected content comprising one or more objects, the one or more objects each referring to a tangible form of a corresponding entity;
in response to receiving the indication, invoke a capture service to request augmentation based on each corresponding entity assigned to the user-selected content by communicating the user-selected content to the capture service with a request for an entity determination;
receive the augmentation, wherein the augmentation comprises at least one entity container and a corresponding determined entity, the at least one entity container comprising one of the one or more objects of the user-selected content that refer to the tangible form of the determined entity,
wherein the at least one entity container further comprises a package of information having a structured schema based on the determined entity, the structured schema for one type of entity being different than that for another type of entity, wherein the structured schema comprises one or more attributes of the one of the one or more objects, and wherein information of the package of information is assigned to corresponding attributes of the one or more attributes;
determine an entity-related user interface corresponding to the determined entity, the entity-related user interface providing a customized user interface layout based on the determined entity, the customized user interface layout for one type of determined entity being different than that for another type of determined entity;
assign the information of the package of information to locations of the entity-related user interface based on the customized user interface layout, wherein each location corresponds to an attribute of the one or more attributes and the information corresponding to that attribute is assigned to that location; and
render a preview of the entity-related user interface.

20. A method of facilitating automatic augmentation of content, comprising:
receiving, at a service, user-selected content from a client device, the user-selected content comprising one or more objects in a document, the one or more objects each referring to a tangible form of a corresponding entity;
in response to receiving the user-selected content, determining, at the service, the corresponding entity of one of the one or more objects in the user-selected content;
generating, at the service, an entity container for the one of the one or more objects, wherein the entity container comprises a package of information having a structured schema based on the determined entity, the structured schema for one type of determined entity being different than that for another type of determined entity, wherein the structured schema comprises one or more attributes of the one of the one or more objects, and wherein information of the package of information is assigned to a corresponding attribute of the one or more attributes;
assigning, at the service, the determined entity as a marker for the one of the one or more objects in the document;
storing the one of the one or more objects and the entity container; and
providing, to the client device, a preview of the entity container for the client device, wherein the entity container comprises a layout template that is consistent for each of a same type of determined entity and different for each of a different type of entity, wherein the layout template is customized for each client device or context.

21. The method of claim 20, wherein determining the entity comprises invoking a search engine service to request a topic card.

22. The method of claim 20, further comprising:
identifying service elements available for the determined entity, wherein generating the entity container for the one of the one or more objects comprises assigning at least one service element to the entity container.

* * * * *